(12) United States Patent
Benet et al.

(10) Patent No.: US 12,134,950 B2
(45) Date of Patent: Nov. 5, 2024

(54) DEPLOYMENT METHODS FOR EXPANDABLE POLYMER GROUT FOR PLUG AND ABANDONMENT APPLICATIONS

(71) Applicants: Chevron Australia Pty Ltd, Perth (AU); Chevron U.S.A. Inc., San Ramon, CA (US)

(72) Inventors: Paul Michael Benet, Perth (AU); Michael James Fuller, Cypress, TX (US); Douglas Cory Arceneaux, Katy, TX (US); Eduardo Martinez, Houston, TX (US); George Nabil Farag, Perth (AU)

(73) Assignees: CHEVRON U.S.A. INC., San Ramon, CA (US); CHEVRON AUSTRALIA PTY LTD, Perth (AU)

( * ) Notice: Subject to any disclaimer, the term of this patent is extended or adjusted under 35 U.S.C. 154(b) by 0 days.

(21) Appl. No.: 18/256,915

(22) PCT Filed: Dec. 9, 2021

(86) PCT No.: PCT/US2021/062540
§ 371 (c)(1),
(2) Date: Jun. 9, 2023

(87) PCT Pub. No.: WO2022/132552
PCT Pub. Date: Jun. 23, 2022

(65) Prior Publication Data
US 2024/0026749 A1    Jan. 25, 2024

Related U.S. Application Data

(60) Provisional application No. 63/223,472, filed on Jul. 19, 2021, provisional application No. 63/125,840, filed on Dec. 15, 2020.

(51) Int. Cl.
*E21B 33/138*  (2006.01)
*C09K 8/42*    (2006.01)
*C09K 8/44*    (2006.01)

(52) U.S. Cl.
CPC ............ *E21B 33/138* (2013.01); *C09K 8/426* (2013.01); *C09K 8/44* (2013.01)

(58) Field of Classification Search
CPC .......... B21B 33/138; C09K 8/426; C09K 8/44
See application file for complete search history.

(56) References Cited

U.S. PATENT DOCUMENTS 3,637,019 A    1/1972 Lee
3,878,686 A    4/1975 Hageman et al.
(Continued)

FOREIGN PATENT DOCUMENTS

CN    111 395 973 A    7/2020

OTHER PUBLICATIONS

International Search Report for PCT/US2021/062540 dated Feb. 7, 2022.
Written Opinion for PCT/US2021/062540 dated Feb. 7, 2022.

*Primary Examiner* — Silvana C Runyan
(74) *Attorney, Agent, or Firm* — King & Spalding LLP

(57) ABSTRACT

A deployment system for deploying a polymer grout system includes a first conduit line for conveying an isocyanate component, a second conduit line for conveying an organic polyol component, and a mixer for mixing the isocyanate component and the organic polyol component to form an expandable polymer grout system that is deployed to a target location associated with a wellbore. The deployment system can include a tailpipe and/or bridge plug for directing the expandable polymer grout system to the target location. The disclosure also includes methods of using the foregoing deployment system.

20 Claims, 16 Drawing Sheets

(56) References Cited

U.S. PATENT DOCUMENTS

| | | | | |
|---|---|---|---|---|
| 4,817,721 A | * | 4/1989 | Pober | C09K 8/5086 |
| | | | | 166/295 |
| 5,409,071 A | * | 4/1995 | Wellington | E21B 47/005 |
| | | | | 166/290 |
| 8,997,867 B2 | * | 4/2015 | Leleux | C09K 8/44 |
| | | | | 166/300 |
| 10,851,620 B2 | | 12/2020 | Hoffman | |

* cited by examiner

DEPLOYMENT METHODS FOR EXPANDABLE POLYMER GROUT FOR PLUG AND ABANDONMENT APPLICATIONS

CROSS-REFERENCE TO RELATED APPLICATION

This application is a national phase application of PCT/US2021/062540, filed Dec. 9, 2021, which claims priority to U.S. Provisional Patent Application No. 63/125,840, filed Dec. 15, 2020, and which claims priority to U.S. Provisional Patent Application No. 63/223,472, filed Jul. 19, 2021. The entire contents of the foregoing applications are incorporated herein.

TECHNICAL FIELD

The present application relates to methods of deploying materials for sealing in subterranean formations, and more particularly, to methods of deploying low-permeability, expandable polymeric grout for plug and abandonment (P&A) operations for subterranean oil and gas wells.

BACKGROUND

P&A operations are an important part of the lifecycle of oil and gas producer and injector wells, and typically involve placing a series of mechanical and/or chemical barriers in the wellbore and annulus between a target zone and the surface. Effective P&A operations ensure long term protection from containment issues such as loss of well control, ground contamination, and gas migration (to surface). Conventional P&A designs often rely on cement plugs as the primary barrier against reservoir/surface communication. However, in some cases, gas or other reservoir fluid migration through or around the cement plug to the surface may be experienced, resulting in an unsuccessful P&A operation.

Potential modes of poor cement integrity upon initial placement include micro-annuli formation due to wellbore pressure changes, channeling due to inadequate wellbore fluid removal, cracks, cement shrinkage (if the cement has no access to additional water), cement dehydration due to fluid loss (if placed in the open hole), and delayed set due to contamination/dilution with wellbore fluids. However, one of the biggest challenges with isolating a shallow gas zone with a cement plug is the transition time of the cement from a liquid to a solid. The time should be minimized to prevent gas influx, but at shallow depths with lower hydrostatic pressures above the cement plug and cooler temperatures, it is a difficult slurry design problem. In other instances, gas migration past annular cement barriers may occur, where placement of adequate quantity and quality cement to remediate may be more challenging.

A number of commercial alternative solutions to cement plugs have been introduced and used in worldwide cases, some of which have achieved improved mitigation of gas migration. One alternative involves the use of a high-solids-fraction solution comprising a plurality of sand grain particle sizes, intended to pack tightly, forming a low-permeability plug. A second alternative includes the usage of solvent-borne solutions of polymer that, on curing downhole, renders a solid (non-porous) resin plug across the target interval. Another alternative involves thermite generated heat, optionally used with low-melt-temperature metals (including bismuth), that may sinter both the formation (reducing near-wellbore, NWB, porosity) and/or optionally applies an impermeable coating of the bismuth metal or alloy. While each of these solutions strives to achieve a low-permeability barrier across the target location, none of these alternative products, however, exhibits high expansion (in volume) that would both lead to improved invasion into (and plugging within) the formation porosity and optionally improved sealing against the solid formation and casing interfaces.

Therefore, a need exists for expandable fluid solutions that can achieve significant improvement in gas-migration control in P&A operations.

SUMMARY OF THE INVENTION

This summary is provided to introduce various concepts in a simplified form that are further described below in the detailed description. This summary is not intended to identify required or essential features of the claimed subject matter nor is the summary intended to limit the scope of the claimed subject matter.

Aspects of this disclosure are directed to systems and methods that may be useful for plugging and abandoning a portion or entirety of a hydrocarbon well. The systems and methods can be used to improve gas migration control in or adjacent to a hydrocarbon well. In particular, systems and methods for deploying an expandable polymer grout plug are described herein.

In one aspect, a deployment system can include a first conduit that conveys an isocyanate component through the wellbore, a second conduit that conveys an organic polyol component through the wellbore, a packer disposed in the wellbore, and a mixer coupled to the first conduit, the second conduit, and the packer. The organic polyol component conveyed through the second conduit of the foregoing system can include a blowing agent. The mixer can be configured to: a) receive the isocyanate component via the first conduit and the organic polyol component via the second conduit, b) mix the isocyanate component and the organic polyol component into an expandable polymer grout system; and c) expel the expandable polymer grout system from an outlet of the mixer to a target location associated with the wellbore.

The foregoing deployment system can include one or more of the following features. A tailpipe can be coupled to the outlet of the mixer, the tailpipe comprising apertures in a sidewall of the tailpipe, wherein the tailpipe receives the expandable polymer grout system from the outlet of the mixer and expels the expandable polymer grout system from the apertures in the sidewall of the tailpipe. The tailpipe can optionally be removably coupled to the outlet of the mixer by a disconnect device so that the tailpipe can left in the grout after the mixer is removed from the wellbore. In the foregoing system, the mixer can be a static mixer or a pressurized impingement mixer. The first conduit and the second conduit can be separated or can be part of a concentric coiled tube. The target location can be a portion of the wellbore below the mixer and proximate to a gas zone in a surrounding formation. The foregoing system can include a bridge plug disposed in the wellbore below the mixer and a retainer plug above the mixer, wherein the target location comprises perforations in a casing within the wellbore, and wherein the retainer plug and the bridge plug cause the expandable polymer grout system to be deployed through and into the perforations.

In another aspect, a deployment system can include a first conduit that conveys an isocyanate component through the wellbore, a second conduit that conveys an organic polyol component through the wellbore, and a mixer coupled to the first conduit and the second conduit. The mixer can be configured to: a) receive the isocyanate component via the first conduit and the organic polyol component via the second conduit, b) mix the isocyanate component and the organic polyol component into an expandable polymer grout system; and c) expel the expandable polymer grout system from an outlet of the mixer to a target location associated with the wellbore.

The foregoing deployment system can include one or more of the following features. A tailpipe can be coupled to the outlet of the mixer, the tailpipe comprising apertures in a sidewall of the tailpipe, wherein the tailpipe receives the expandable polymer grout system from the outlet of the mixer and expels the expandable polymer grout system from the apertures in the sidewall of the tailpipe. In the foregoing system, the mixer can be a static mixer or a pressurized impingement mixer. The first conduit and the second conduit can be separated or can be part of a concentric coiled tube. The target location can be a portion of the wellbore below the mixer and proximate to a gas zone in a surrounding formation. The organic polyol component conveyed through the second conduit of the foregoing system can include a blowing agent.

In yet another aspect, a method for deploying an expandable polymer grout plug in a wellbore, comprises: a) pumping an isocyanate component via a first conduit through a wellbore; b) pumping an organic polyol component via a second conduit through the wellbore; c) mixing, in a mixer coupled to the first conduit and the second conduit, the isocyanate component and the organic polyol component to produce the expandable polymer grout system; and d) directing the expandable polymer grout system from an outlet of the mixer to a target location associated with the wellbore.

The foregoing method can include one or more of the following features. The expandable polymer grout system can be directed from the outlet of the mixer through a tailpipe and out of sidewall apertures in the tailpipe to the target location. The foregoing method can also include decoupling, by a disconnect device, the tailpipe from the outlet of the mixer and leaving the tailpipe in the expandable polymer grout system after the mixer is removed from the wellbore. In the foregoing method, the target location can be a portion of the wellbore below the mixer and proximate to a gas zone in a surrounding formation. In another example of the foregoing method, the target location can comprise perforations in a casing within the wellbore, wherein a packer and a bridge plug further direct the expandable polymer grout system into the perforations. The target location can further comprise an annulus between the casing and a wall of the wellbore.

DEFINITIONS

Figure 1:
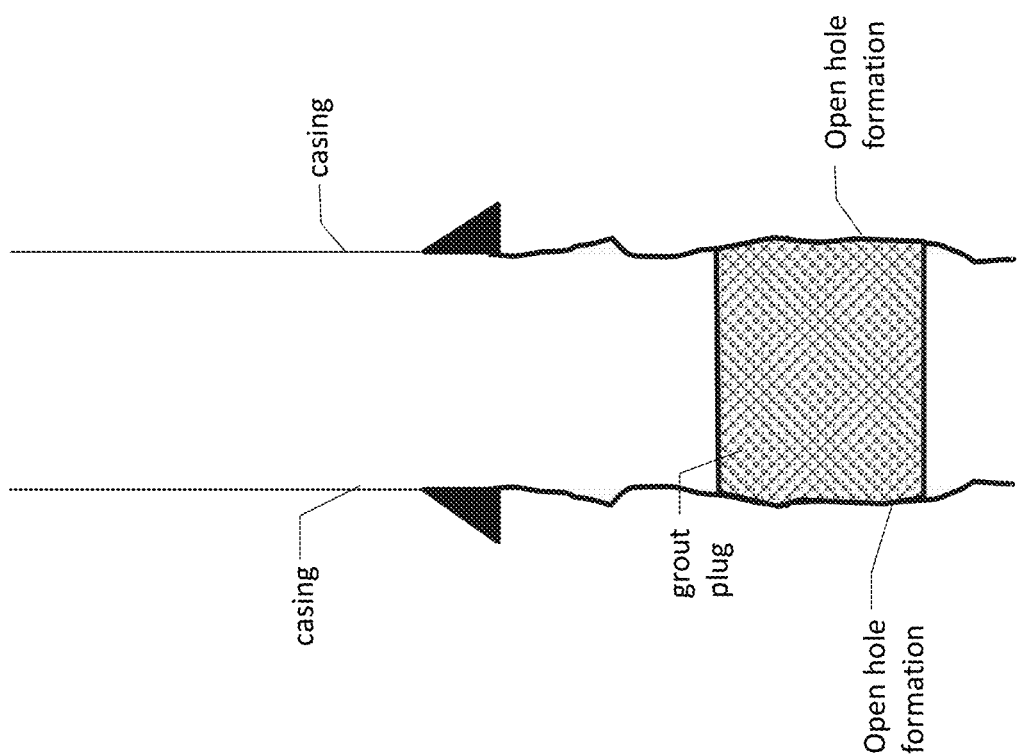
FIG. 1 is a sectional view drawing of a plug according to the embodiments for sealing an open hole between rock formations.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

The term "plug" is used herein to refer to a polymer barrier to fluid communication or flow within or adjacent to a wellbore, the polymer barrier being created by the expandable polymer grout systems described herein, and positioned at a target location(s) along the length of the wellbore, including within tubulars positioned within the borehole, open hole sections, annular areas, perforations connected therewith, and/or within combinations thereof. The polymer plugs may be utilized for permanent plugging operations, such as for plugging and abandonment operations. The polymer plugs also may be utilized for remedial or temporary plugging operations, such as for formation stabilization or fluid control, sand control, sealing off lost circulation zones, sealing off water flow zones, and for structural wellbore stabilization, such as during drilling or completion operations. The polymer plugs also may be used to seal or squeeze off existing perforations or to isolate one section of a wellbore from fluid communications with another, including an interior throughbore and/or an annular portion of the wellbore, from another section of the wellbore.

As referred to herein, the term "P&A" means "plug and abandonment".

As referred to herein, the term "wellbore" includes the borehole and any tubulars and compositions positioned therein.

As referred to herein, the term "coupled" can refer to two components that are in direct contact or directly attached to one another as well as two components that are joined or attached by a third component.

DESCRIPTION OF THE INVENTION

Expandable polymer grout systems and methods are disclosed herein that are useful for plugging and abandoning a portion or entirety of a wellbore and related structures. The systems and methods can be used to improve gas migration control in, or adjacent to, a wellbore (e.g. hydrocarbon well). The disclosed methods comprise introduction into or through the wellbore and/or wellbore supporting formation of an expandable polymer grout system to create a plug for fluid-flow restriction. The present invention provides systems and methods for downhole plugging applications in zones with a wider range of bottomhole temperatures, pressures, and depths, over what is currently available.

In certain embodiments, the expandable polymer grout system can be used as a stand-alone barrier. The expandable polymer grout system can be used as a primary or secondary barrier, for example, in P&A operations. In certain embodiments, the system is used as a primary barrier in combination with another barrier type (such as a cement plug) acting as a secondary barrier. In certain embodiments, the system can be used in combination with a conventional cement (or other non-expandable alternative) as primary barrier with the expandable polymer grout system as a secondary barrier.

In certain embodiments, the system is deployed with a blowing agent to a downhole location, for example, in or through a wellbore. Blowing agents can be, for example, inert liquids that have low boiling points and non-reactivity to isocyanate groups. These blowing agents are evaporated during exothermic reaction of polyurethane to generate blowing gas. In certain embodiments, the components of the expandable polymer grout system are in liquid or solution form (injectable during deployment) and will set up into an expanded state once adequately mixed together and placed into the formation, perforations, annulus, and/or wellbore upon reaching the target location.

The expandable polymer grout system according to the embodiments can be optimized in order to achieve various performance properties to ensure successful application through the exemplary methods. In particular, the systems and methods can be varied to optimize gas migration control, density, expansion percentage, curing time and water sensitivity.

In certain embodiments, the system may, under bottomhole temperatures and pressures, render an expanded and cured solid polymer that will seal the formation and all associated interfaces against gas migration following placement. In certain embodiments, the seal is gas-tight. Short-term gas migration control may be demonstrated in laboratory testing. In certain embodiments, the cured expanded polymer grout system provides minimal shrinkage over years downhole in order to maintain the gas-migration control over time. In certain embodiments, the expandable polymer grout system is designed to minimize chemical hydrolysis at bottomhole temperatures that could further compromise long-term gas migration.

Depending on the level of expansion (due to action of the blowing agents in the system), the resultant plug may vary significantly in the ultimate density (known as the free-rise density). Conversely, the hydrostatic pressure and optionally applied surface pressure may inhibit some expansion of the grout leading to higher cured densities. In certain embodiments, the expandable polymer grout system described herein yields plugs that range in free rise density from about 2 to about 62 lbm/ft$^3$. Optimization of the system can be carried out to find the best balance of annular gas migration control and sufficiently low permeability (through the porous expanded grout).

Parallel measurement of expansion (volume %) is a factor that can impact gas migration control. Selection of the most preferred expansion level will also be based on optimization of the balance between annular gas migration control and grout permeability. Further, optimization of the cured expansion may need to account for any hydrostatic and/or applied pressure during the curing process.

Differences in the expandable polymer grout system may lead to differences in the curing time. Practitioners in polyurethane chemistry often report several types of time for each system (from the "cream time" at which the solution color becomes turbid through the "rise time"); and differences in the system, specifically concentrations of blowing agent and catalysts, can lead to differences in curing time. In certain embodiments, the expandable polymer grout system is optimized with regards to curing times to ensure that the expansion and setting does not occur until the full volume of blended components are placed within the target location.

Depending on the components of the expandable polymer grout system, the system may have higher or lower sensitivity to water that may be experienced downhole (including in the formation matrix itself). In certain embodiments, the expandable polymer grout system is designed to minimize sensitivity to downhole water (which would lead to higher expansion and lower final density).

In certain embodiments, the expandable polymer grout system, or method of injecting the system, is designed to minimize sensitivity to any fluids that may reside in the annular space or formation porosity prior to injection. In certain embodiments, the methods described herein involve the injection of either a fluid or gas pre-flush to displace near wellbore fluids deeper into the formation, up the annulus, or up the wellbore, prior to injection of the polyurethane precursor blend.

In certain embodiments, the volume of the reaction product (i.e., the volume of the polymer plug or the expanded and cured polymer grout system) is about 2 to 13 times the initial combined volume of the components of the polymer grout system before reacting. In certain embodiments, the expandable polymeric grout system has a free rise density in the range of about 2 to about 62 lbm/ft$^3$. In certain embodiments, the expandable polymeric grout system has a confined density in the range of about 15 to about 40 lbm/ft$^3$.

Generally, the plug formed from the expandable polymeric grout system undergoes gas migration failure at very high pressures, if at all. In certain embodiments, the minimum gas migration failure pressure is at least about 500, about 1000, about 2000 or about 2500 psi. In certain embodiments, the expandable polyurethane grout system has a specific gravity after expansion in the range of about 0.05 to about 0.6, about 0.09 to about 0.53, about 0.09 to about 0.30, or about 0.09 to about 0.15.

Expandable Polymer Grout System

Generally, the expandable polymer grout comprises a polyurethane. The polyurethane is formed from the reaction of an isocyanate component and an organic polyol component. In certain embodiments, the reaction of the isocyanate component and the organic polyol component proceeds by combining the components in the presence of a blowing agent and, optionally, a catalyst, at a temperature of at least about 15° C. or about 20° C. to form the expandable polymer grout. In certain embodiments, the reaction of the isocyanate component and the organic polyol component proceeds by combining the components in the presence of a blowing agent and, optionally, a catalyst, at a temperature in the range of about 15° C. to about 60° C., or about 20° C. to about 40° C.

The term "polyurethane", as referred to herein, is not limited to those polymers which include only urethane or polyurethane linkages. In certain embodiments, the polyurethane polymers may also include allophanate, carbodiimide, uretidinedione, and other linkages in addition to urethane linkages.

In one embodiment, an expandable polymer grout system comprises the reaction product of: (i) an isocyanate component comprising one or more isocyanate compounds; and (ii) an organic polyol component comprising one or more organic polyol compounds; in the presence of (iii) one or more blowing agents. In certain embodiments, the expandable polymer grout system further comprises one or more auxiliary components, as described herein.

In certain embodiments, the expandable polymer grout comprises about 40 to about 60 percent by weight the isocyanate component and about 40 to about 60 percent by weight the organic polyol component.

In certain embodiments, the expandable polymer grout system can be deployed (e.g., injected) into or through the wellbore as a pre-mixed system of the isocyanate component and the organic polyol component, wherein at least one of the components is slow-reacting or has delayed activation.

Due to the commonly rapid formation of the polyurethane product upon combining the isocyanate component and organic polyol component, it may be necessary to separate the components until they are placed at or near the site for plug formation. In certain embodiments, the expandable polymer grout system can be deployed (e.g., injected) into or through the wellbore as a two-component system, wherein the isocyanate component and the organic polyol component are introduced separately. In certain embodiments, the isocyanate component and the organic polyol component are mixed downhole, for example near or at the site for plug formation (i.e., target location).

In exemplary embodiments, the isocyanate component and the organic polyol component will be in liquid form, where the viscosity of the components may vary. In other embodiments, the isocyanate component and the organic polyol component may be dissolved in inert solvents to reduce the viscosities.

In certain embodiments, the expandable polymer grout system yields either rigid or flexible/elastomeric material. In certain embodiments, the expandable polymer grout system yields a material suitable for superior gas-migration control and low-permeability after polymerization and curing. In certain embodiments, the expandable polymer grout system yields materials or plugs that exhibit chemical bonding to the formation, the casing/pipe, or both for improved gas migration control.

Isocyanate Component

According to the embodiments, the isocyanate component may comprise one or more types of isocyanate compounds. In certain embodiments, the isocyanate compound is a polyisocyanate having two or more functional groups, e.g., two or more NCO functional groups. According to one embodiment, the polyisocyanate includes those represented by the formula $Q(NCO)_n$ where n is a number from 2-5 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Suitable isocyanates for purposes of the present invention include, but are not limited to, aliphatic and aromatic isocyanates. In certain embodiments, the isocyanate is selected from the group consisting of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), ethylene diisocyanate; 1,4-tetramethylene diisocyanate; 1,12-dodecane diisocyanate; cyclobutane-1,3-diisocyanate; cyclohexane-1,3- and -1,4-diisocyanate, and mixtures of these isomers; 2,4- and 2,6-hexahydrotoluene diisocyanate and mixtures of these isomers; dicyclohexyl-methane-4,4'-diisocyanate 1,3- and 1,4-phenylene diisocyanate; naphthylene-1,5-diisocyanate; triphenylmethane-4,4', 4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups; and combinations thereof.

Suitable isocyanates for use in the expandable polymer grouts described herein include but are not limited to: toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable rigid polyurethane foams can also be prepared from aromatic diisocyanates or isocyanates having one or two aryl, alkyl, arakyl or alkoxy substituents wherein at least one of these substituents has at least two carbon atoms.

In certain embodiments, the isocyanate has an NCO content of from about 25 to about 33 weight percent; a nominal functionality of from about 2 to about 3.5; and a viscosity of from about 60 to about 2000 cps, or about 200 to about 700 cps, at 25° C. (77° F.).

In certain embodiments, the isocyanate components comprise polymeric diphenylmethane diisocyanate.

In certain embodiments, the isocyanate component may be an isocyanate prepolymer. An isocyanate prepolymer comprises a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Suitable non-limiting examples of aminoalcohols include ethanolamine, diethanolamine, triethanolamine, and combinations thereof.

In certain embodiments, the isocyanate compounds may also be provided in a chemically "blocked" state, whereby a reaction to "deblock" the isocyanate may happen prior to polymerization, optionally under downhole conditions, to expose the active isocyanate functionalities. The exposed isocyanates will then react with the organic alcohol groups of the polyol to form the urethane bonds. As such, blocked isocyanate compounds can be used to prevent premature reaction of the isocyanate component with the organic polyol component. Blocked isocyanates regenerate the isocyanate function through heating. Typical unblock temperatures range between 65 to 200° C., depending on the isocyanate structure and blocking agent.

In certain embodiments, the isocyanate component comprises blocked isocyanate compounds, or an isocyanate compound that has been protected with a blocking agent.

Suitable isocyanate blocking agents may include alcohols (including phenols), ethers, phenols, malonate esters, methylenes, aceto acetate esters, lactams, oximes, ureas, bisulphites, mercaptans, triazoles, pyrazoles, secondary amines, glycolic acid esters, acid amides, aromatic amines, imides, diaryl compounds, imidazoles, carbamic acid esters, or sulfites.

Exemplary phenolic blocking agents include phenol, cresol, xylenol, chlorophenol, ethylphenol and the like.

Lactam blocking agents include gamma-pyrrolidone, laurinlactam, epsilon-caprolactam, delta-valerolactam, gamma-butyrolactam, beta-propiolactam and the like.

Methylene blocking agents include acetoacetic ester, ethyl acetoacetate, acetyl acetone and the like.

Oxime blocking agents include formamidoxime, acetaldoxime, acetoxime, methyl ethylketoxine, diacetylmonoxime, cyclohexanoxime and the like.

Mercaptan blocking agent include butyl mercaptan, hexyl mercaptan, t-butyl mercaptan, thiophenol, methylthiophenol, ethylthiophenol and the like.

Acid amide blocking agents include acetic acid amide, benzamide and the like. Imide blocking agents include succinimide, maleimide and the like.

Amine blocking agents include xylidine, aniline, butylamine, dibutylamine diisopropyl amine and benzyl-tert-butyl amine and the like.

Imidazole blocking agents include imidazole, 2-ethylimidazole and the like.

Imine blocking agents include ethyleneimine, propyleneiniine and the like.

Triazole blocking agents include 1,2,4-triazole, 1,2,3-benzotriazole, 1,2,3-tolyl triazole and 4,5-diphenyl-1,2,3-triazole.

Alcohol blocking agents include methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate, ethyl lactate and the like. Additionally, any suitable aliphatic, cycloaliphatic or aromatic alkyl monoalcohol may be used as a blocking agent in accordance with the present disclosure. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be used. Suitable cycloaliphatic alcohols include, for example, cyclopentanol, cyclohexanol and the like, while aromatic-alkyl alcohols include phenyl carbinol, methylphenylcarbinol, and the like.

Dicarbonylmethane blocking agents include malonic acid esters such as diethyl malonate, dimethyl malonate, di(iso) propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; and acetylacetates such as methyl acetoacetate, ethyl acetoacetate, propyl acetoacetate, butyl acetoacetate and alkoxyalkyl acetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl) malonate. Malonic or alkylmalonic acid esters derived from linear aliphatic, cycloaliphatic, and/or arylalkyl aliphatic alcohols may also be used. Such esters may be made by alcoholysis using any of the above-mentioned alcohols or any monoalcohol with any of the commercially available esters (e.g., diethylmalonate). For example, diethyl malonate may be reacted with 2-ethylhexanol to obtain the bis-(2-ethylhexyl)-malonate. It is also possible to use mixtures of alcohols to obtain the corresponding mixed malonic or alkylmalonic acid esters. Suitable alkylmalonic acid esters include: butyl malonic acid diethylester, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloro-malonate.

Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is incorporated herein by reference. Mixtures of the above-listed isocyanate blocking agents may also be used.

Blocked polyisocyanate compounds may include, for example, polyisocyanates having at least two tree isocyanate groups per molecule, where the isocyanate groups are blocked with an above-described isocyanate blocking agent.

Blocked isocyanates may be prepared by reaction of one of the above-mentioned isocyanate compounds and a blocking agent by a conventionally known appropriate method.

In other embodiments, the blocked isocyanates used in embodiments disclosed herein may be any isocyanate where the isocyanate groups have been reacted with an isocyanate blocking agent so that the resultant capped isocyanate is stable to active hydrogens at room temperature but reactive with active hydrogens at elevated temperatures, such as between about 65° C. to 200° C.

Blocked polyisocyanate compounds are typically stable at room temperature. When heated to a temperature about the minimum unblocking temperature, the blocking agent is dissociated to regenerate the free isocyanate groups, which may readily react with hydroxyl groups of the organic polyol compounds.

As an alternative to an external or conventional blocking agent, the isocyanates of the present disclosure may be internally blocked. The term internally blocked, as used herein, indicates that there are uretdione groups present which unblock at certain temperatures to free the isocyanate groups for cross-linking purposes. Isocyanate dimers (also referred to as uretdiones) may be obtained by dimerizing diisocyanates in the presence of phosphine catalysts. In certain embodiments, the blocking agent is selected from the group consisting of: methylethylcetoxime (MEKO), diethyl malonate (DEM), 3,5-dimethylpyrazole (DMP).

Organic Polyol Component

According to the embodiments, the organic polyol component may comprise one or more types of organic polyol compounds, which are reactive with the isocyanate compounds. Organic polyol compounds suitable for use in the present invention may include, but are not limited to, polyether polyols, polyester polyols, polycarbonate polyols, and biorenewable polyols. Such polyols may be used alone or in suitable combination as a mixture.

General functionality of polyols used in the present invention is between about 2 to about 5, or about 2 to about 3. The weight average molecular weight of polyols may be between about 500 and about 10,000, or about 500 and about 5,000 g/mol.

The proportion of the organic polyol compounds is generally of between about 10 and about 80% by weight, preferably between about 20 and about 50% based of the expandable polymer grout system.

Polyether polyols for use in the present invention include alkylene oxide polyether polyols such as ethylene oxide polyether polyols and propylene oxide polyether polyols and copolymers of ethylene and propylene oxide with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Polyester polyols for use in the present invention include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present invention may also include: linear or lightly branched aliphatic (e.g. adipates) polyols with terminal hydroxyl group; low molecular weight aromatic polyesters; polycaprolactones; polycarbonate polyol. Those linear or lightly branched aliphatic (e.g. adipates) polyols with terminal hydroxyl group are produced by reacting a dicarboxyl acids with an excess of diols, triols and their mixture; those dicarboxyl acids include, but are not limited to, for example, adipic acid, AGS mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol.

In certain embodiments, the organic polyol component is selected from aromatic polyester polyol and an aliphatic polyester polyol.

The aromatic polyester polyol is typically formed via the condensation of a glycol and a dicarboxylic acid or acid derivative. The functionality, structure, and molecular weight of the polyester polyol can be varied to tailor the processing characteristics and physical properties of the expanded polymer grout system to a particular application. In certain embodiments, the aromatic polyester polyol has a functionality of greater than 2 or about 2 to about 5 and a weight-average molecular weight of from 500 to 5,000 g/mol, or about 1,000 to 3,000 g/mol. In certain embodiments, the aromatic polyester polyol has a hydroxyl value of from 100 to 500 mg KOH/g. In certain embodiments, the aromatic polyester polyol has a viscosity at 25° C. of from about 5,000 to about 20,000 cps, or about 9,000 to about 14,000 cps. In certain embodiments, the aromatic polyester polyol has a specific gravity of about 1.0 to about 1.2 g/cm$^3$. In certain embodiments, the aromatic polyester polyol is present in the organic polyol component in an amount of from about 25 to about 100 parts by weight, based on 100 parts by weight of the total weight of the polyols present in the organic polyol component.

The aliphatic polyester polyol is typically formed via the condensation of a glycol and a dicarboxylic acid or acid derivative. In certain embodiments, the aliphatic polyester polyol has a functionality of greater than 2 or about 2 to about 5 and a weight-average molecular weight of from 500 to 5,000 g/mol, or about 1,000 to 3,000 g/mol. In certain embodiments, the aliphatic polyester polyol has a hydroxyl value of from 20 to 400 mg KOH/g. In certain embodiments, the aliphatic polyester polyol has a viscosity at 25° C. of from about 10,000 to about 20,000 cps, or about 15,000 to about 19,000 cps. In certain embodiments, the aliphatic polyester polyol has a specific gravity of about 1.0 to about 1.2 g/cm$^3$. In certain embodiments, the aliphatic polyester polyol is present in the organic polyol component in an amount of from about 2 to about 100 parts by weight, based on 100 parts by weight of the total weight of the polyols present in the organic polyol component.

In certain embodiments, one or more aliphatic polyester polyol and one or more aromatic polyester polyol are both present in in the organic polyol component, for example in a ratio of from 1:5 to 1:15.

Polycarbonate polyols are derived from carbonic acid that can be produced through the polycondensation of diols with phosgene, although transesterification of diols, commonly hexane diol, with a carbonic acid ester, such as diphenylcarbonate.

Biorenewable polyols suitable for use in the present invention include castor oil, sunflower oil, palm kernel oil, palm oil, canola oil, rapeseed oil, soybean oil, corn oil, peanut oil, olive oil, algae oil, and mixtures thereof.

Blowing Agents, Catalysts and Other Auxiliary Components

Typically, the isocyanate component and the organic polyol component are reacted in the presence of a blowing agent to form the expandable polymer grout. The blowing agent may be a physical blowing agent, a chemical blowing agent, or a combination of a physical blowing agent and a chemical blowing agent.

The term "physical blowing agent" refers to blowing agents that do not chemically react with the isocyanate and/or the organic polyol component. The physical blowing agent can be a gas or liquid. The liquid physical blowing agent typically evaporates into a gas when heated, and typically returns to a liquid when cooled. Examples of physical blowing agents include volatile liquids such as chlorofluorocarbons, partially halogenated hydrocarbons or non-halogenated hydrocarbons like propane, n-butane, isobutane, n-pentane, isopentane cyclopentane and/or neo-pentane. In a particular embodiment, the blowing agent comprises, or consists essentially of, cyclopentane.

The term "chemical blowing agent" describes blowing agents which chemically react with the isocyanate or with other components to release a gas for foaming. Examples of chemical blowing agents include water, gaseous compounds such as nitrogen or carbon dioxide, gas (e.g. CO2) forming compounds such as azodicarbonamides, carbonates, bicarbonates, citrates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures. In a particular embodiment, the blowing agent comprises, or consists essentially of, water.

In certain embodiments, the total amount of the blowing agents present in the reaction mixture or in the organic polyol component in an amount of from about 1 to about 30, or about 10 to about 25, parts by weight, based on 100 parts by weight of the organic polyols present in the organic polyol component.

In one embodiment, the expandable polymer grout system comprises a physical blowing agent. In one embodiment, the expandable polymer grout system comprises a chemical blowing agent. In one embodiment, the expandable polymer grout system comprises both a physical blowing agent and a chemical blowing agent.

In one embodiment, the expandable polymer grout system comprises one or more catalysts. In certain embodiments, the one or more catalysts are present in the organic polyol component to catalyze the reaction between the isocyanate and the polyols. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., tin, bismuth, lead, etc. One non-limiting example of a suitable catalyst is N,N-dimethylcyclohexylamine.

In one embodiment, the expandable polymer grout system comprises one or more surfactants. The surfactant typically supports homogenization of the blowing agent and the polyol and regulates a cell structure of the expandable polymer grout. In certain embodiments, the one or more surfactants are present in the organic polyol component. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One specific, non-limiting example of a surfactant is a silicone-polyether block copolymer.

The expandable polymer grout system, or organic polyol component, may optionally include one or more additional auxiliary components. Suitable additives for purposes of the instant disclosure include, but are not limited to, chain-extenders, crosslinkers, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, plasticizers, silane coupling agent, cell stabilizers, fillers, or any combination thereof.

In one embodiment, the proportion of the auxiliary components present in the expandable grout composition is of between about 5 and about 80 percent by weight, or about 10 and about 60 percent by weight, the total weight of the expandable polymer grout system.

In certain embodiments, the two component systems have the isocyanate delivered as an isolated component (not combined with other reactants or additives) and the organic polyol component may be pre-blended with blowing agents, catalysts and other auxiliary components, as described above.

In certain embodiments, the performance properties of the expandable polymer grout system may be adjusted through the addition of the blowing agents, catalysts and auxiliary components.

In certain embodiments, it may be desirable to combine or mix the expandable polymer grout system with other functional materials, such as fluid-loss control particulates to mitigate premature or excessive loss of the liquid polymer into the formation or annulus prior to the polymer setting up or crosslinking in the desired locations. In certain embodiments, the expandable polymer grout system may be combined with cement such as to enhance certain properties of the cement. Combinations with materials such as cement may provide enhanced material properties for operations such as forming an improved seal for plug and abandonment, or to squeeze a casing leak in a collar, or to squeeze off perforations. Prior to the polymer crosslinking or otherwise reacting, the disclosed polymers may exhibit flow properties that are more Newtonian and less viscous than liquid cement, thereby flowing into tighter flowpaths than cement alone otherwise might.

Methods of Use

The expandable polymer grout system according to the embodiments may be deployed or injected downhole to form plugs within, or to seal, various features of a subterranean formation, including but not limited to a hydrocarbon well (or well bore), a well casing, perforations, reperforations, an annulus (open, partially filled or filled with broken or poor quality cement), natural fractures, pores (formation porosity), micro-annuli (e.g. between the casing and the annulus), space between a well casing and cement plug, space in the cement plug, gaps or breaks in casing or casing collar, fractures in cement in an annulus, gaps between cement in an annulus and the formation rock, or other leakage pathways in a subterranean formation, and combinations thereof.

In certain embodiments, the expandable polymer grout system can be used to form a plug in one or more perforations, for example, perforations that are either placed during initial casing-perforation or in later casing-reperforation activities. In certain embodiments, the expandable polymer grout system can be used to form a plug in one or more perforations formed during a casing-perforation operation. In certain embodiments, the expandable polymer grout system can be used to form a plug in one or more perforations formed during a casing-reperforation operation. In certain embodiments, one or more plugs formed from the expandable polymer grout system described herein can be used to plug one or more uphole perforations (or reperforations) to divert flow downhole. In certain embodiments, the expandable polymer grout system can be used to form a plug in the casing so as to stop flow from proceeding downhole.

Methods of deployment downhole will depend on both the characteristics and reactivity of the expandable polymer grout system as well as the intended usage downhole.

The systems may be deployed with or through the wellbore, thereby forming a plug, injected into the annulus between two casing strings or into the annulus between a casing and formation, or combinations thereof for maximized plugging. In certain embodiments, the annulus between two casing strings is not completely sealed with cement. In certain embodiments, the annulus between two casing strings contains broken or fractured cement.

In certain embodiments, a method for creating expandable polymer grout plugs within or through a wellbore, comprises:
  (I) providing an expandable polymer grout system to a target location within or through a wellbore, wherein the expandable polymer grout system comprises: (i) an isocyanate component comprising one or more isocyanate compounds; and (ii) an organic polyol component comprising one or more organic polyol compounds; in the presence of (iii) one or more blowing agents;
  (II) combining components (i), (ii) and (iii) of the expandable polymer grout system to facilitate the polymerization reaction to form the expandable polymer grout plug at the target location; and (III) allowing the expandable polymer grout plug to cure at the target location. In certain embodiments, one or more plugs formed from the system according to the embodiments may be formed at targeted sites or zones, rather than filling an entire feature or cavity. For example, a plug formed from the systems according to the embodiments may be set at a target location or target zone of a specific depth in a well, rather than filling the well. To provide sealing at a specific depth, spotting of the polyurethane precursors may be isolated using packers, optionally using coiled tubing, coiled hose(s), custom umbilical, or other conduit to target the solution placement.

Methods of injection to form plugs according to the embodiments, for example annular plugs, may involve injection of the system through existing perforations, reperforations, section-milled windows, cutting slots, or other means of annular access with customized geometry. In certain embodiments, methods of injection to form plugs according to the embodiments may involve injection into area where the casing has been cut and pulled out of the well.

In certain embodiments, the isocyanate component and organic polyol component are injected through a form of dual-string injection, where each component is injected through an isolated tube, are combined optionally in a mixing chamber (such as discussed in some prior art) placed at the target interval (optionally between packers), and the combined precursors are then injected from the mixing chamber into the wellbore and/or annular space. This injection will be followed by a static curing time, to allow the expandable polymer to first expand and then to cure into the fully polymerized (optionally hardened) state. The curing may optionally be carried out under additional pressure applied through both the workstring and/or the annulus (possibly to control the degree of expansion and/or density or to further squeeze the precursor blend into the annulus). Injection of the precursors through the mixing chamber may optionally be followed by a flush stage of an inert fluid or gas (that does not participate in the polymerization/curing process) prior to expansion and curing to purge and clean the mixing chamber.

In certain embodiments, the isocyanate and polyol components of the expandable polymeric grout are injected into the hydrocarbon well or wellbore separately.

In certain embodiments, the components of the expandable polymer grout are injected into the hydrocarbon well through dual-string injection or through isolated tubes.

In certain embodiments, the components of the expandable polymer grout are combined in a mixing chamber prior to injection into the region in which a plug is to be formed.

The expandable polymer grout system can be used in methods of creating plugs within or through a wellbore. In certain embodiments, the method for creating expandable polymer grout plugs within or through a wellbore comprises: (I) providing an expandable polymer grout system to a target location, wherein the expandable polymer grout system comprises: (i) an isocyanate component comprising one or more isocyanate compounds; and (ii) an organic polyol component comprising one or more organic polyol compounds; in the presence of (iii) one or more blowing agents; (II) combining components (i), (ii) and (iii) of the expandable polymer grout system to facilitate the polymerization reaction to form the expandable polymer grout plug at the target location and (III) allowing the expandable polymer grout plug to cure at the target location.

In certain embodiments, the initial combining of the components may be conducted at surface, prior to being pumped into the wellbore, while in other embodiments the components will be combined inside the wellbore. In certain embodiments, the target location is at a location within the wellbore, in the perforations and/or formation surrounding the wellbore. In certain embodiments, the target location is at a location accessed through the wellbore.

In some operations, the presently disclosed technology may include methods and systems for plugging portions or sections of a wellbore or related structures. Exemplary operations may include plug and abandonments, recompletions, prevention of lost circulation during drilling operations, stabilizing bore hole walls during drilling, sealing off water or gas flow zones during drilling operations, and to squeeze off existing perforations, such as during completion or recompletion operations.

In certain embodiments, the method comprises creating the polymer plug within a wellbore tubular positioned within the wellbore, such as within casing, tubing, drill-pipe, coil tubing, or a liner.

In certain embodiments, the method comprises creating the polymer plug at least partially in an annular area external to a wellbore tubular positioned within the wellbore. Such operations may be affiliated, for example, with what is conventionally known in the art as a plug and abandonment operation, a primary cementing-type operations, a remedial cementing-type of job, and a completion cementing type of operation.

In certain embodiments, the method functions to create a barrier to fluid flow or fluid communication.

In certain embodiments, the method comprises creating a polymer plug across an interval in an open hole portion of the wellbore, such as a rock-to-rock bridge plug (see FIG. 1).

Figure 2:
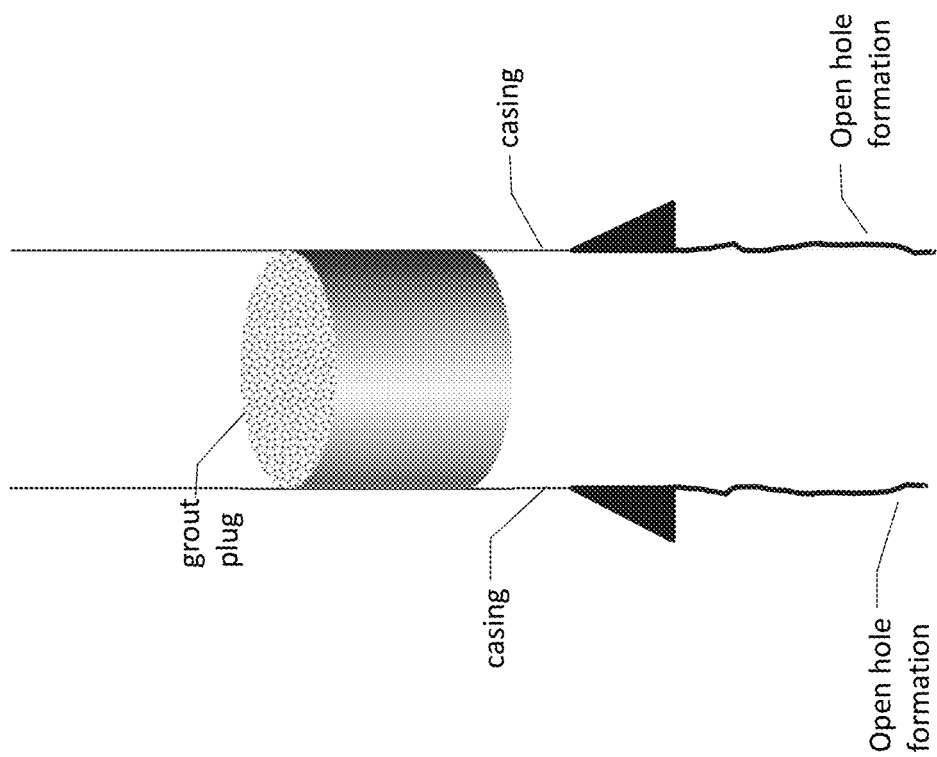
FIG. 2 is a sectional view drawing of a plug according to the embodiments for sealing a casing, or casing shoe.

In certain embodiments, the method comprises creating a polymer plug inside a casing or casing shoe (i.e., a cased hole bridge plug) (see FIG. 2). In certain embodiments, the method comprises creating a polymer plug to seal a casing or casing shoe (see FIG. 2).

Figure 3:
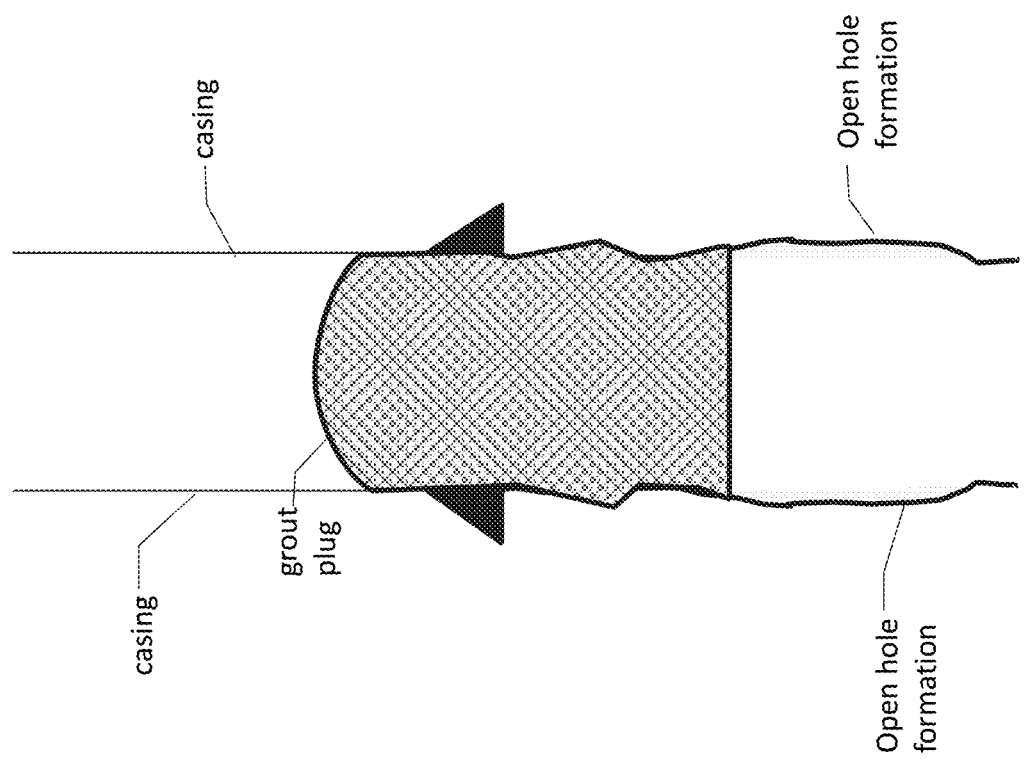
FIG. 3 is a sectional view drawing of a plug according to the embodiments for sealing both a casing shoe and an open hole.

In certain embodiments, the method comprises creating a polymer plug in an open hole portion of the wellbore and in a casing or casing shoe (see FIG. 3). In certain embodiments, the method comprises creating a polymer plug to seal both a casing shoe and an open hole (see FIG. 3).

Figure 4B:
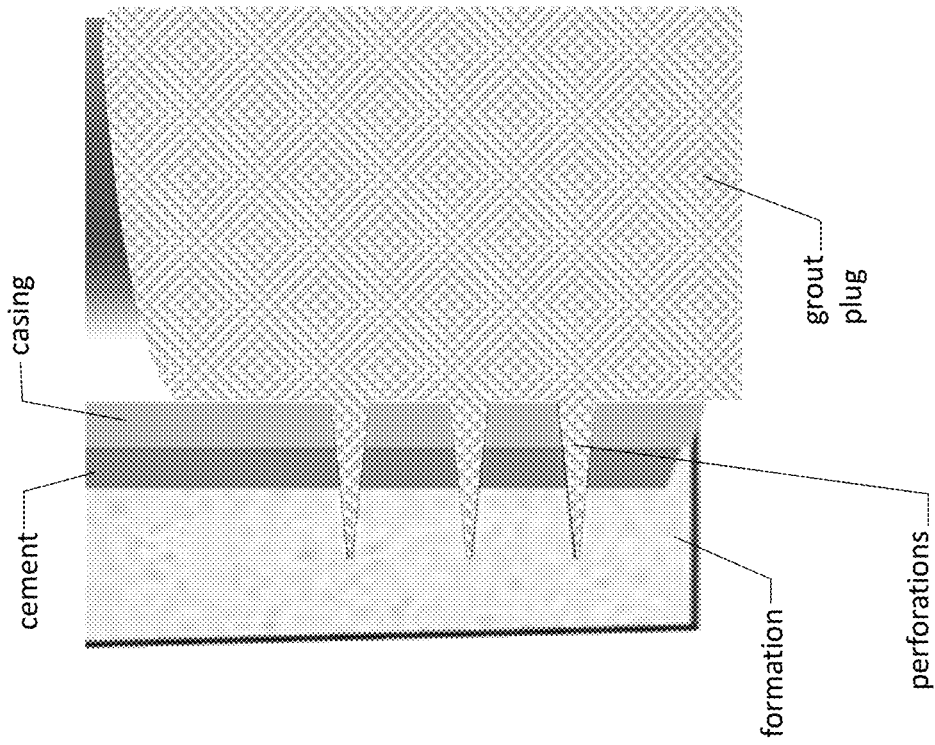
FIG. 4(b) is a sectional view drawing of a plug according to the embodiments for sealing casing perforations by squeezing the exemplary grout system into the perforations.
Figure 4A:
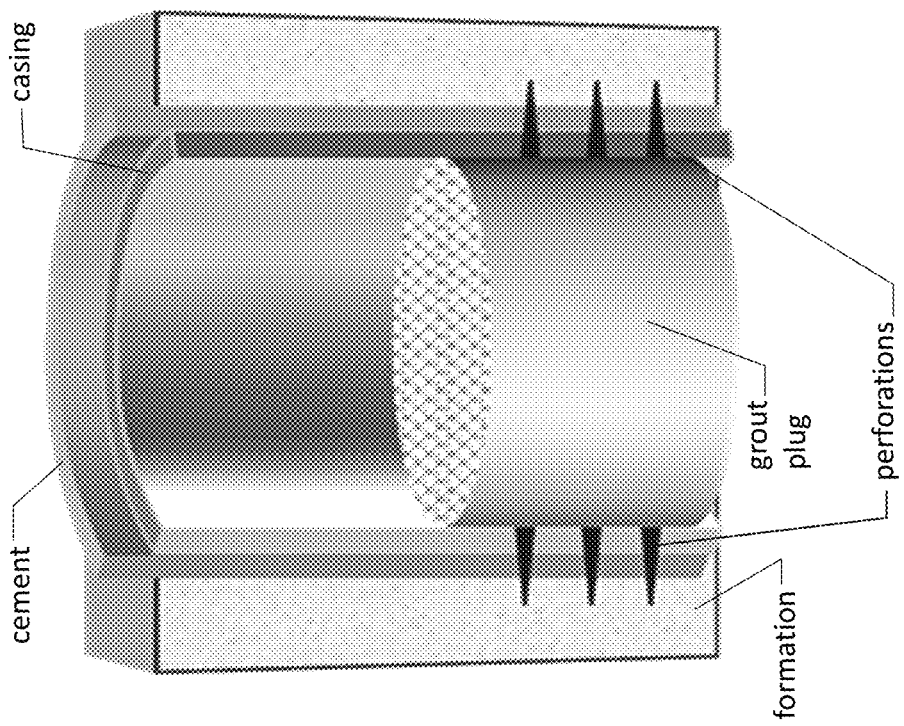
FIG. 4(a) is a sectional view drawing of a plug according to the embodiments for sealing casing perforations by applying the exemplary grout system across the perforations.

In certain embodiments, the method comprises creating a polymer plug in or across perforations or reperforations in a casing (see FIGS. 4(a) and 4(b)).

In certain embodiments, the method comprises creating a polymer plug to seal casing perforations (or reperforations) by applying the exemplary grout system across the perforations (or reperforations) (see FIG. 4(a)).

In certain embodiments, the method comprises creating a polymer plug to seal casing perforations (or reperforations) by squeezing the exemplary grout system into the perforations (or reperforations) (see FIG. 4(b)).

Figure 5:
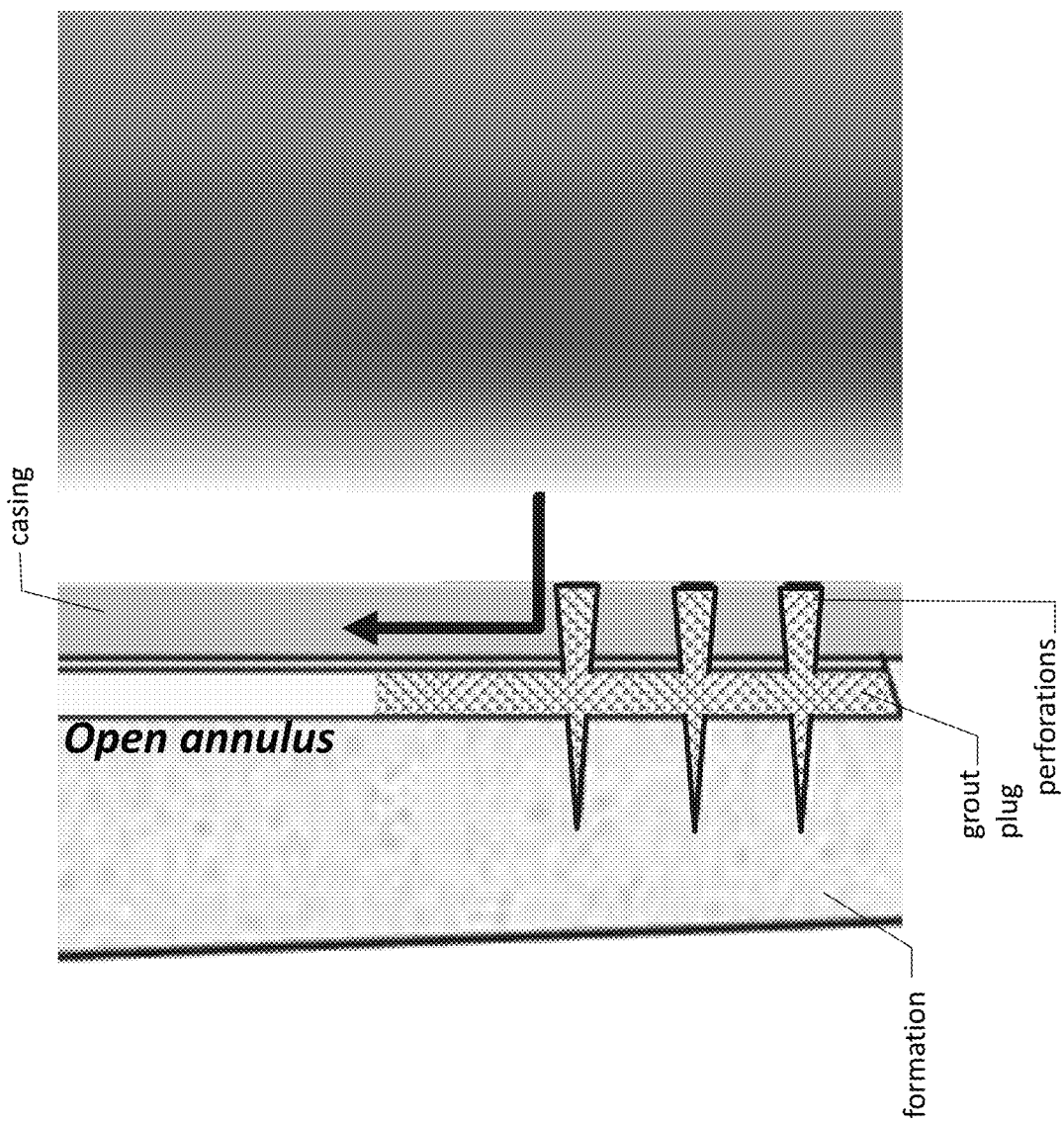
FIG. 5 is a sectional view drawing of a plug according to the embodiments for sealing an open annulus by squeezing the exemplary grout system through casing perforations into the open annulus.

In certain embodiments, the method comprises creating a polymer plug for sealing an open annulus by squeezing the exemplary grout system through casing perforations into the open annulus (see FIG. 5).

Figure 6:
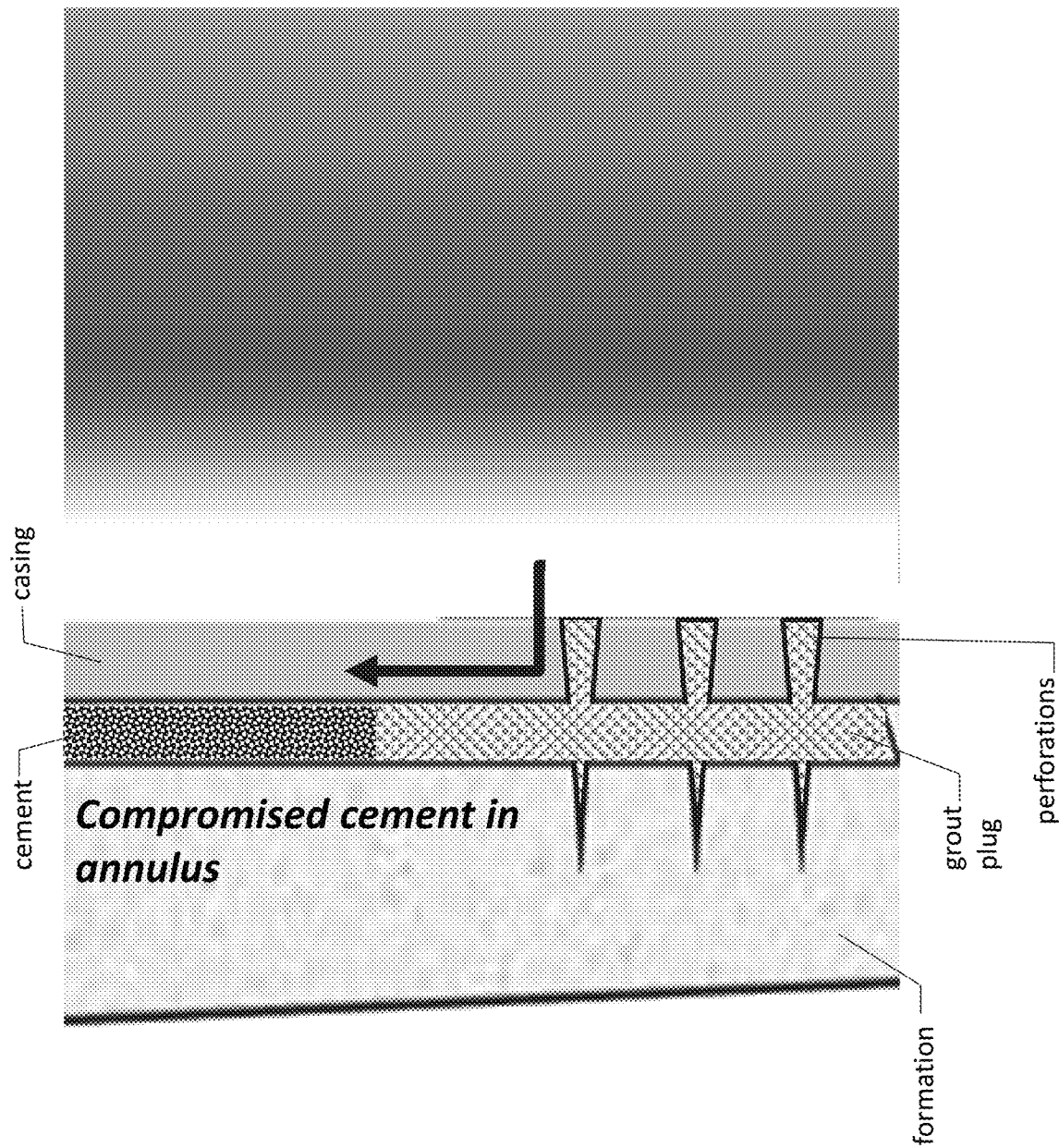
FIG. 6 is a sectional view drawing of a plug according to the embodiments for sealing a compromised annulus (e.g., an annulus containing failed or poor quality cement or "rubble-ized" cement) by squeezing the exemplary grout system through casing perforations into the compromised annulus.

In certain embodiments, the method comprises creating a polymer plug for sealing a compromised annulus by squeezing the exemplary grout system through casing perforations into the compromised annulus (see FIG. 6). In certain embodiments, the compromised annulus contains failed or poor quality cement. In certain embodiments, the compromised annulus contains "rubble-ized" cement.

Figure 7:
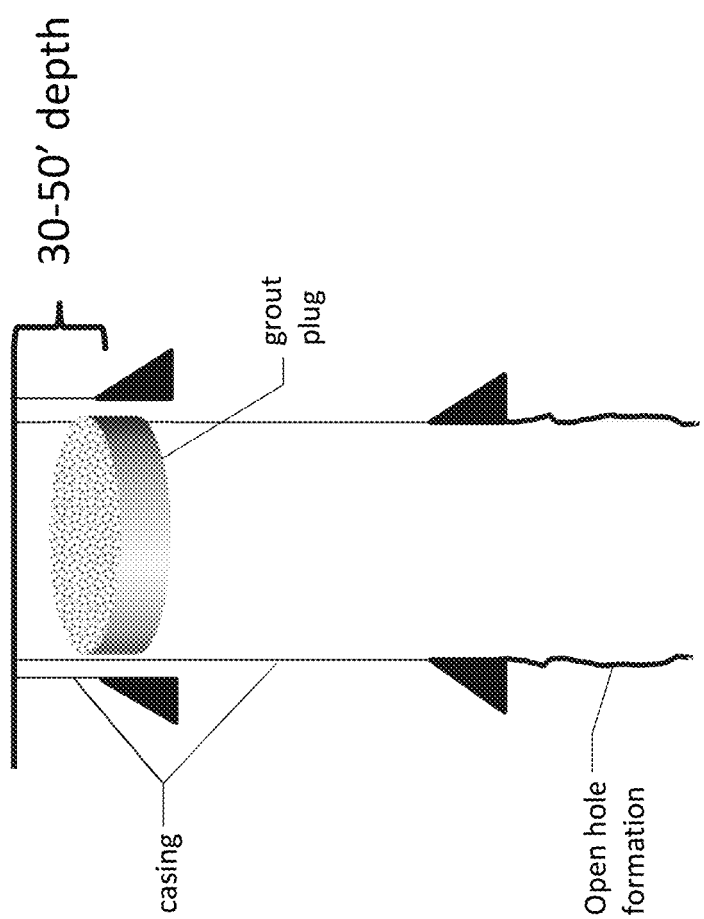
FIG. 7 is a sectional view drawing of a plug according to the embodiments placed shallowly in a casing or near the surface of a wellbore.

In certain embodiments, the method comprises creating a polymer plug for sealing a wellbore or casing by placing the plug shallowly in a casing or near the surface of a wellbore, for example placing the plug at about 30 to about 50 feet below the ground surface or entrance to the wellbore (see FIG. 7).

In certain embodiments, the method comprises creating the plug in area of the wellbore comprising at least one of a perforation and a cut in a wellbore tubular positioned within the wellbore.

In certain embodiments, the method comprises creating a polymer plug in the wellbore during at least one of a drilling operation, a casing operation, a liner operation, completion operation, a recompletion operation, a primary cementing operation, and a staged cementing operation.

Other implementations may further comprise hydraulically squeezing the expandable polymer grout system into at least a portion of a subterranean formation containing the wellbore, while flowable, prior to fully polymerizing, cross-linking, or curing the polymer.

In certain embodiments, the method comprises pumping the expandable polymer grout system into a target location within or through the wellbore as a spotted plug-forming polymer-based fluid using a wellbore tubular positioned within the wellbore; pulling the positioned wellbore tubular out of the selected positioning location within the wellbore such that the wellbore tubular is no longer positioned within the spotted polymer fluid; hydraulically pressurizing the wellbore to displace at least a portion of the spotted liquid polymer plug into at least one of the subterranean formation and an annular area within the wellbore, prior to fully curing the spotted polymer fluid as the cured cross-linked polymer.

In some embodiments, the target location within the wellbore comprises placing the plug in an annular region within the wellbore.

Traditionally cement has been the most common material used for plugging or sealing portions of a wellbore (internal and/or annular), such as during primary, secondary, or remedial cementing operations. The technical improvements disclosed herewith include using the polymers disclosed herein for plugging and such other cementing-type of sealing operations associated with cement, instead of cement or in combination with cement.

In certain embodiments, the method comprises blending (or combining) the components of the expandable polymer grout system prior to pumping the combination downhole or blending (or combining) the components at one location downhole and then pumping the blended components to the target location or another target location downhole. The target location may include a location within the wellbore that at least partially comprises an annular region within the wellbore.

Generally, the presently disclosed systems and methods may provide a plug that is long lasting, easily pumped and can move and fill small potential leak paths, performs at different temperatures and pressures, extremely low permeability once in place, non-shrinking, ductile and non-brittle, resistant to downhole contaminants, and able to bond to the casing or formation where it is placed.

Uses of the presently disclosed systems and methods may include, for example, plugging portions or all of a wellbore as part of a routine plugging operation, such as a plug and abandonment or during a drilling operation. The plugs created according to the technology disclosed herein may include a permanent plug such as for plugging and abandonment operations, or a temporary plug, such as for formation or fluid control, sand control, seal loss circulation zones, or seal off a water flow zone, or for structural wellbore stabilization, such as during drilling or completion operations. The plugs may also be used to seal or squeeze off existing perforations or to hydraulically isolate one section of a wellbore, including an interior throughbore and/or an annular portion of the wellbore, from another section of the wellbore.

In certain embodiments, the method comprises the expandable polymer grout system being subjected to elevated pressure (e.g., downhole) while it is undergoing reaction and forming a plug. In certain embodiments, the applied pressure or hydrostatic pressure is the range of about 500 to about 5,000 psi. In certain embodiments, the application of pressure during the curing of the polymer plug decreases the permeability of the plug compared to when the plug undergoes curing at atmospheric pressure. For example, the addition of top pressures of 100 and 250 psi during curing may lead to an improvement in gas migration control compared to the initial result without applied pressure, but may concurrently alter the expanded density versus ambient expansion.

EXAMPLES

Example 1. Free Rise Expansion Testing

Free rise (volume) expansion under ambient conditions was assessed for several expandable polymer grout systems according to the embodiments. To conduct these measurements, known volumes of an isocyanate component, an organic polyol component and a blowing agent were combined within a beaker or container of known maximum volume and stirred for about 20 to 60 seconds, to make the resultant "grout" mixture. The grout began to expand and was allowed to expand at ambient temperature and pressure without further agitation for at least one hour; depending on the expandable polymer grout system, the time to achieve maximum expansion may range from minutes to several hours.

Once the grout achieved maximum expansion, the (final) volume of the expanded grout was calculated by calculating the volume of the empty volume (within the known volume of the original container) above the expanded grout. The final volume of expanded grout is equal to the total container volume minus the volume of inert fluid (such as water) poured atop the expanded grout until achieving maximum volume. The expansion ratio for each expandable polymer grout system was calculated as the ratio of the final expanded volume of the grout to the initial combined volume of the individual components.

The current example is illustrative of the expansion ratios achieved in a series of expandable polyurethane grout systems that are differentiated by the specific gravity of each expanded product. In particular, the specific gravity of the samples used in these experiments are shown in Table 1.

TABLE 1

| Product | Specific Gravity (kg/m$^3$) |
|---|---|
| A | 0.53 |
| B | 0.30 |
| C | 0.26 |
| D | 0.15 |
| E | 0.09 |

Figure 8:
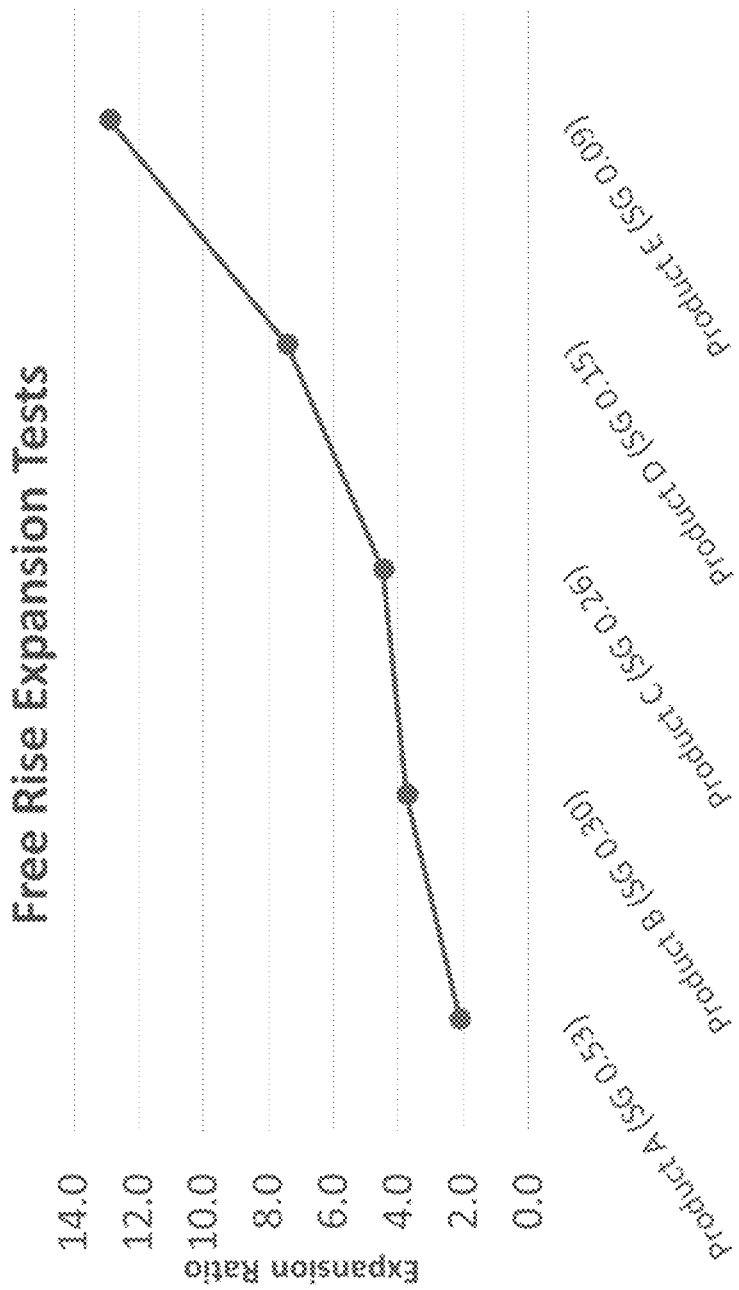
FIG. 8 is a graph depicting free rise expansion of exemplary expandable polymer grout systems.

The results shown in FIG. 8 indicate that the volume of expanded grout in this series may range from roughly 2 to 13× the initial combined volume of components.

It is understood that the expansion properties of an expandable grout under simulated downhole conditions, including physical confinement (of volume) or under applied pressure, will vary from these measurements at ambient conditions. However, these measurements are intended to illustrate the variance in physical properties of exemplary expandable polymer grout systems.

Example 2. Gas Migration Testing

Figure 9:
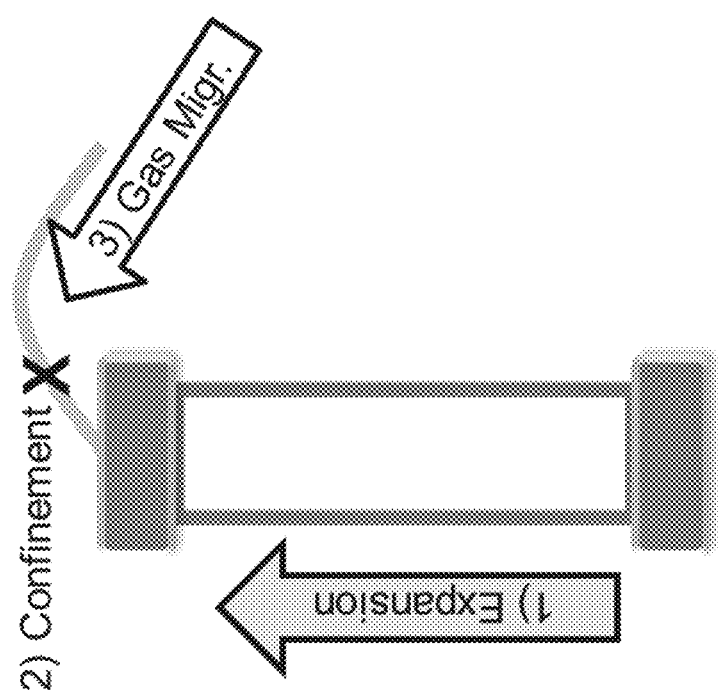
FIG. 9 depicts the apparatus implemented for these measurements, which comprises a pressure cell (that can withstand internal pressure up to 1,000 psi and has a volume>450 mL).

For a functional qualification of expandable grouts for use downhole, advanced test methods were developed that would estimate the ability to limit gas migration around a solid expanded-grout system within a confined volume. FIG. 9 depicts the apparatus implemented for these measurements, which comprises a pressure cell (that can withstand internal pressure up to 1,000 psi and has a volume>450 mL).

Gas migration was measured for several expandable polymer grout systems according to the embodiments. In these experiments, documented volumes of an isocyanate component, an organic polyol component and a blowing agent were combined in the bottom of the pressure cell (with a known maximum internal volume). The top of the cell was immediately installed with the outlet on the top open, after addition of the reagents to the cell. Once the grout had visibly expanded into the cell outlet (top), the outlet was manually closed and further expansion was hampered through volume-confinement in the pressure cell. These experiments were not conducted with application of any additional top pressure above the expanding grout and were only achieved through confinement of volume. With expansion halted, additional time (maintaining volume confinement was allowed for the curing of the grout into a more solid mass. At this point, the cell top was temporarily opened to remove a temporary diaphragm from atop the expanded grout; the top was then fastened again to the cell; the bottom outlet on the cell was opened; and the gas migration potential was measured. To measure gas migration, a constant pressure of gas was carefully applied through the top toward the bottom of the cell. The starting pressure was low (<5 psi), and was increased in small, controlled increments until the first evidence of gas migration was evident through the cell-bottom outlet. (To visualize the pressure of gas migration, the cell bottom outlet was plumbed into a volume of water, and the "gas migration pressure" (at failure) was recorded as the pressure when first bubbles are evident through the bottom outlet.)

Figure 10:
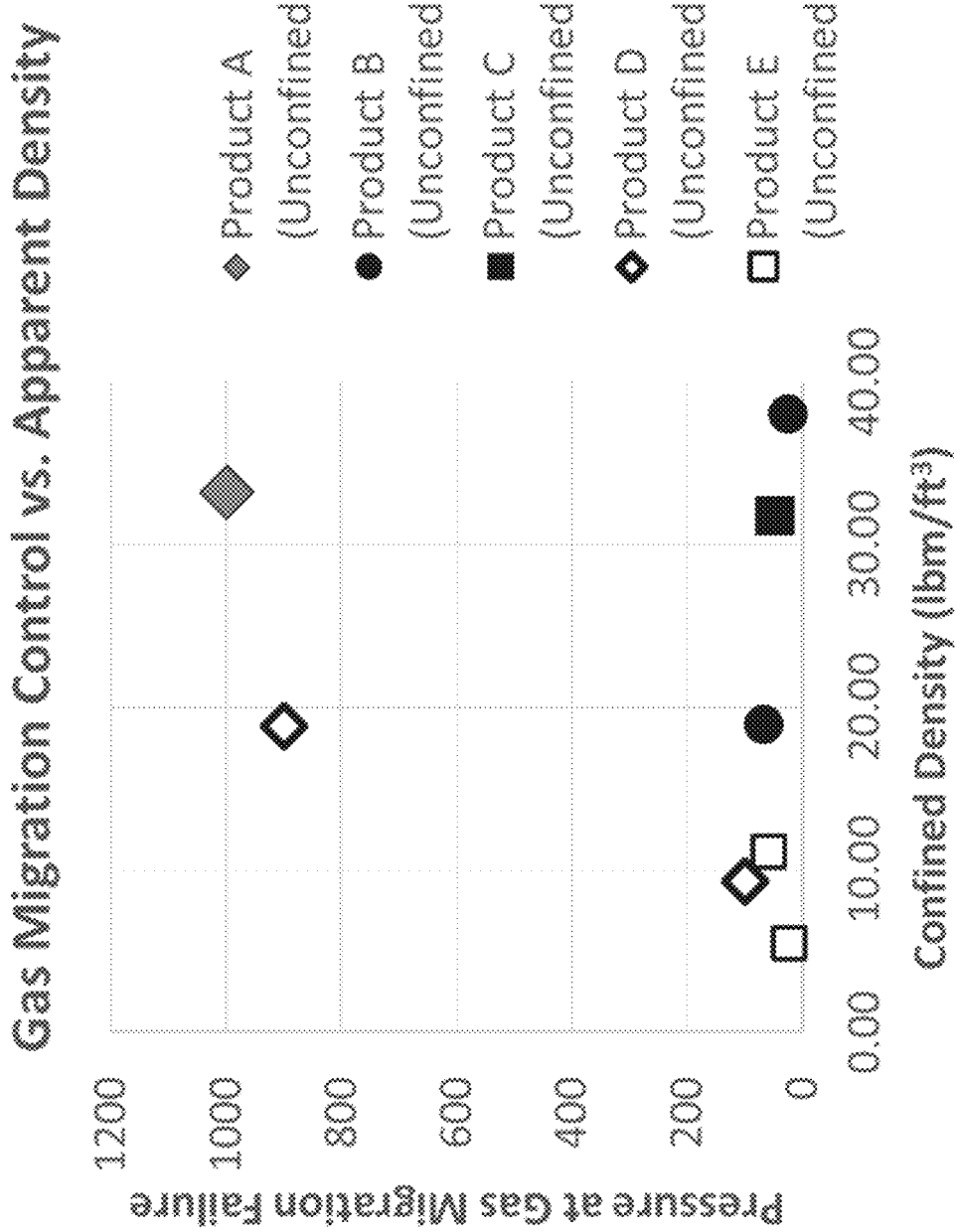
FIG. 10 is a graph depicting the pressure at gas migration control failure plotted against confined density for exemplary and comparative (less than 15 lbm/ft$^3$) expandable polymer grout systems.

As shown in Example 1, the expandable polymer grout systems vary in their ambient expansion characteristics, seen in the different values for unconfined specific gravities. FIG. 10 shows the pressure at gas migration control failure for the same systems, as a function of the confined density of the expanded system. It is evident from FIG. 10 that the pressures at failure for these systems range from about 10 psi to over 1000 psi. Several products were tested at multiple values for confined (apparent) density. This was achieved through confinement of some systems at a volume below the maximum expanded volume that would be expected from the ambient expansion ratios for those systems (i.e., over-packing). In some cases, the maximum potential volume for some systems was >2× the total cell volume, but full expansion was halted on closure of the top cell outlet and through volume confinement. Analysis of the data in FIG. 10 shows that the effectiveness of gas migration control is not purely a function of the confined density of the expanded grout.

Example 3. Gas Migration with Applied Top Pressure

Application of the expandable polymer grout systems in accordance with the exemplary methods may expose the systems to elevated pressures during expansion, due to the hydrostatic head of fluid that will be applied above the blended grout mixture during expansion in downhole uses. Accordingly, the gas migration capacity of expandable polymer grout systems at multiple levels of applied top-pressure was assessed. Tests were conducted in a long pressure cell with a volume of at least 450 mL or in a short pressure cell with a volume of at least 100 mL. Appropriate amounts of the reagents, which were calculated to produce a certain volume of expanded polymer grout when combined, were added to the cell; the cell top was installed again; and a constant top-pressure of gas was applied through the top gas inlet and maintained throughout the expansion and curing of the expandable grout. Following the curing, the top-pressure was released; then the gas migration pressure was measured by applying a constant pressure of gas through the top toward the bottom of the cell. The starting pressure was low (<5 psi), and applied pressure was increased in small, controlled increments until the first evidence of gas migration is evident through the cell-bottom outlet.

Figure 11:
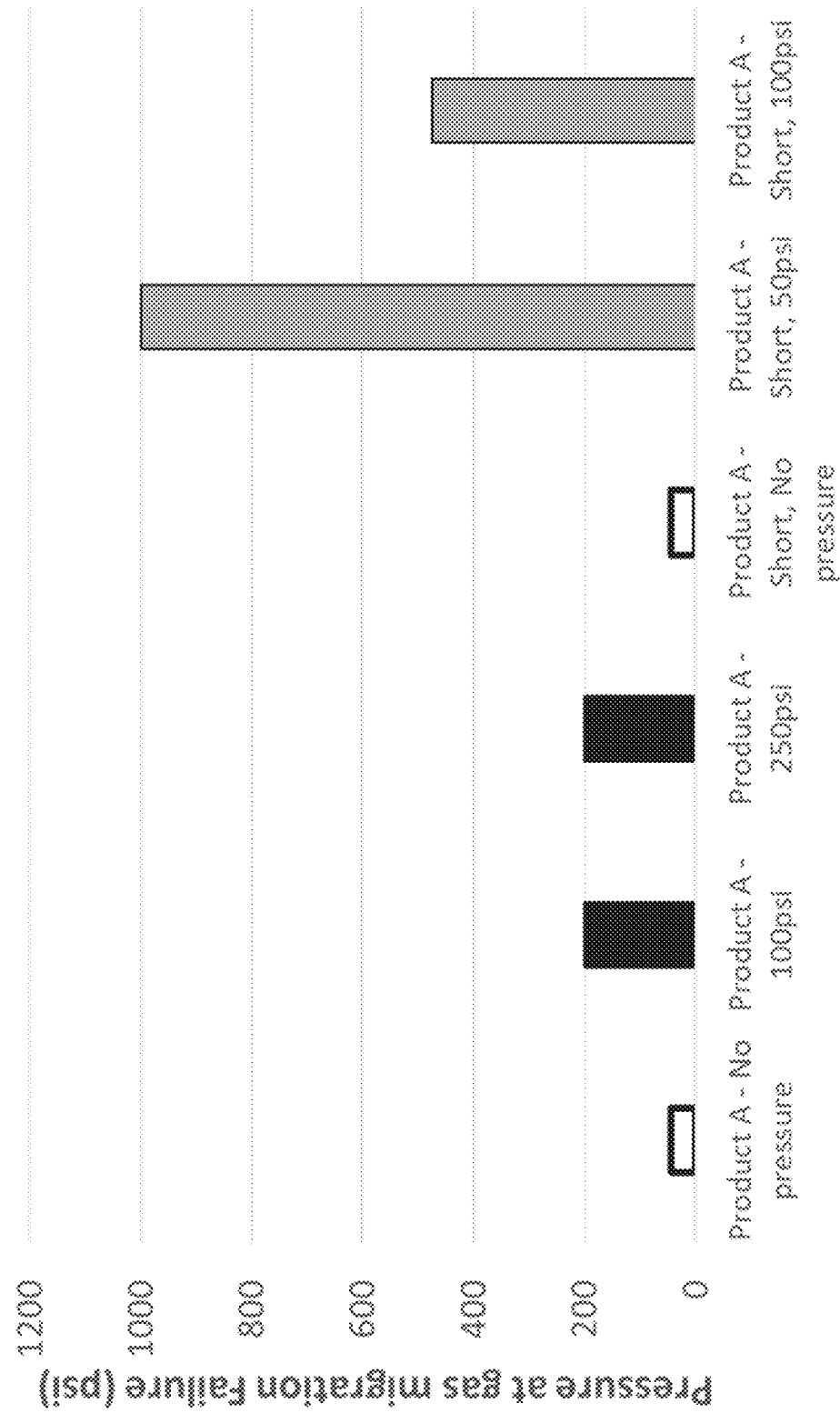
FIG. 11 is a graph depicting the pressure at gas migration control failure plotted against applied pressure of an exemplary expandable polymer grout systems subject to two different vessel and several different applied pressures.

FIG. 11 shows the gas migration (failure) measurements for a series of tests conducted using the expandable grout mixture referred to as Product A in both the long and short pressure cell. It was observed that the addition of top pressures of 50, 100 or 250 psi during curing improved gas migration control compared control tests without applied pressure. Applied top pressure in either cell (long or short) improved gas migration control for the Product A expanded polymer grout system.

Deployment of Expandable Polymer Grout in a Well

Ongoing work is underway to mature chemical systems based on expandable grout derivatives for use in plug and abandonment applications for shallow gas migration control. These grouts include systems that generally comprise two-component precursors that, when blended, form foamed polyurethane. However, the reactions between most polyurethane precursors are often so rapid that current methods for mixing, injection downhole, and placement/isolation into a target location at a low rate of injection (such as bullheading and/or cement-squeeze applications) are insufficient to mitigate the risks of this rapid reactivity. For example, if two common polyurethane precursors were blended through batch mixing on the surface and pumped downhole using conventional low-rate pumps (such as cement pumps), the grout expansion would likely initiate before or during conveyance downhole. Additionally, with the expected pump times at low rates of injection, the expanded grout would likely cure into a solid in the work-string or casing before reaching the target location. As such, current conventional deployment methods and equipment for mixing, conveying downhole, and isolating placement of current polymeric resins used for wellbore isolation are less appropriate for expandable grout systems, due to heightened risks present during execution and injection downhole.

The following description provides examples of deployment systems for deploying an expandable polymer grout system to a target location associated with a wellbore. Due to the commonly rapid reaction of the precursors of the expandable polymer grout system and formation of the polyurethane product, the following example deployment systems provide advantages in that they allow for mixing of the precursors within the wellbore and proximate to the target location. The following example deployment systems also facilitate directing the combined precursors of the expandable polymer grout system with accuracy to the target location.

The target location can be within the wellbore. Alternatively, the target location can be one or more of: a) perforations within a casing positioned within a well, b) an annulus located between two casings within a well, or c) an annulus located between a casing and a formation face of the well. Accordingly, the expandable polymer grout system can be deployed to various target locations associated with a well that require sealing in accordance with a plug and abandonment operation performed on the well.

Figure 12:
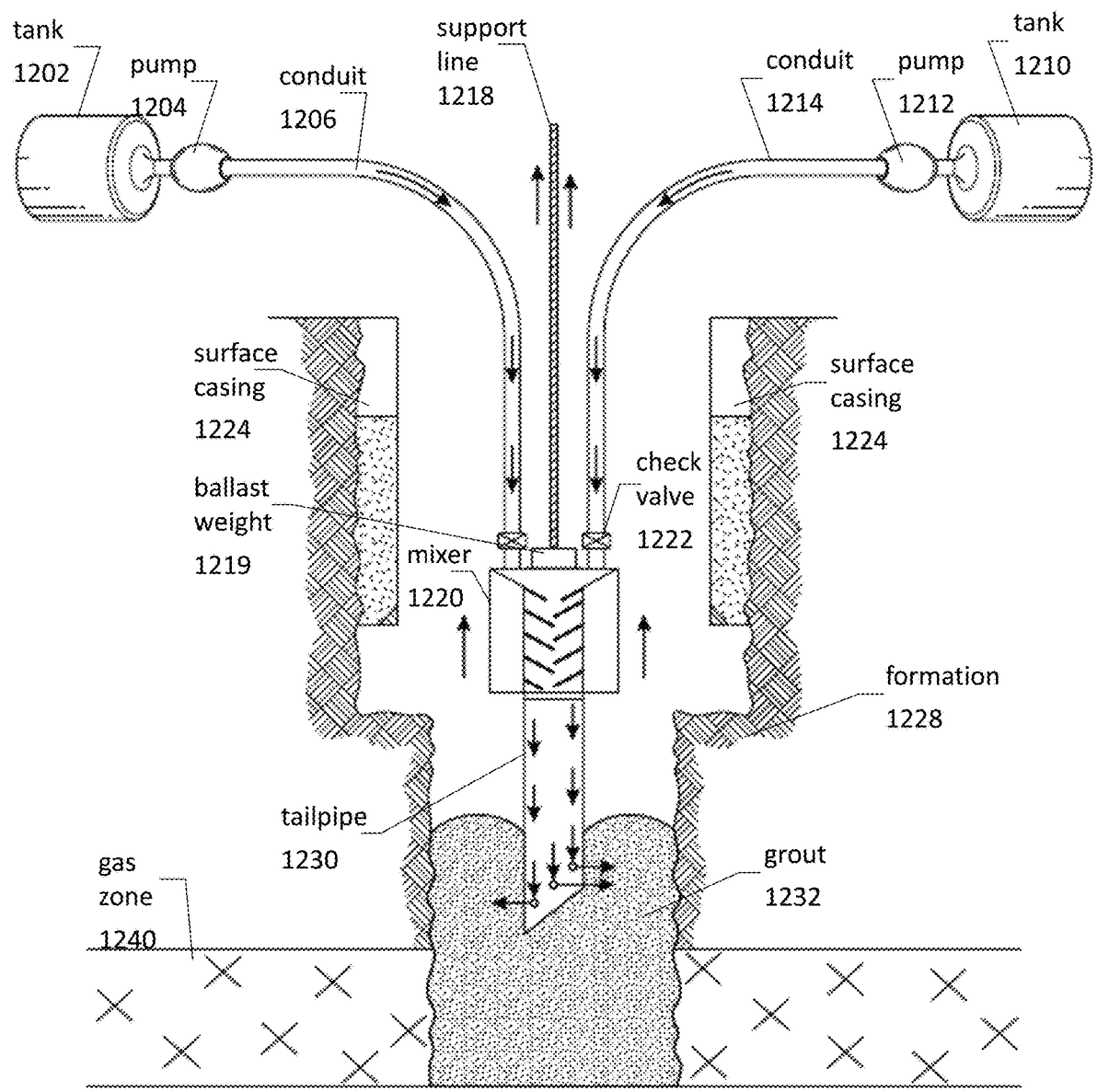
FIG. 12 is a sectional view drawing of a system for deploying an expandable polymer grout system in accordance with the example embodiments described herein.

Referring to FIG. 12, an example system is illustrated for deploying an expandable polymer grout system at a target location within a wellbore. The example system of FIG. 12 includes a first conduit 1206 that delivers an isocyanate component through a wellbore to a mixer 1220. The isocyanate flows from a tank 1202 and is pumped via a pump 1204 through the first conduit 1206. A check valve at the end of the first conduit 1206 controls the flow of the isocyanate into the mixer 1220. The example system of FIG. 12 also includes a second conduit 1214 that delivers an organic polyol component through the wellbore to the mixer 1220. The organic polyol component flows from a tank 1210 and is pumped via a pump 1212 through the second conduit 1214. A check valve 1222 at the end of the second conduit 1214 controls the flow of the organic polyol component into the mixer 1220. As explained previously, the organic polyol component may be pre-blended with blowing agents, catalysts, and other auxiliary components before the component it pumped into the wellbore via pump 1212. The tanks 1202 and 1210 can be stationary tanks located at the surface of the formation 1228 or can be mobile tanks mounted on vehicles.

The mixer 1220 with the attached first conduit 1206 and attached second conduit 1214 can be raised and lowered into the wellbore by support line 1218. The mixer 1220 can also have a ballast weight 1219 that assists in lowering the mixer 1220 into the wellbore in the event there is fluid in the wellbore that provides an upward buoyant force on the mixer 1220. The wellbore of FIG. 12 includes a surface casing 1224 that has a cylindrical shape and that lines the perimeter of the upper portion of the wellbore to prevent the well from collapsing. Below the surface casing 1224 is the open well exposed to the walls of the formation 1228.

In the example illustrated in FIG. 12, the mixer 1220 is a static mixer with helical internal surfaces that mix the isocyanate component and the organic polyol component as they flow into the mixer 1220 from the first conduit 1206 and the second conduit 1214. As the isocyanate component and the organic polyol component combine within the mixer, they react and form the expandable polymer grout system. The mixed components of the expandable polymer grout system exit the mixer 1220 through an outlet at the bottom of the mixer 1220 and flow into a tailpipe 1230 attached to the bottom of the mixer 1220. As illustrated in the example of FIG. 12, the tailpipe 1230 preferably has a tapered bottom that assists in minimizing the likelihood that the tailpipe will become stuck on other equipment as it is lowered with the mixer into the wellbore. The mixture of the expandable polymer grout system flows into the tailpipe 1230 and apertures in the tailpipe direct the flowing mixture to a target location. In the example of FIG. 12, the bottom of the tailpipe 1230 is closed and the apertures are located in a sidewall of the tailpipe 1230 to facilitate flow of the mixture out of the tailpipe 1230, however, in other embodiments, the apertures can be located at other positions on the tailpipe. The shape of the tailpipe and the positions of the apertures can be selected to accurately direct the mixture to the desired target location.

The target location in the example of FIG. 12 is a zone at the bottom of the wellbore adjacent to a gas zone 1240. The expandable polymer grout system, or simply the grout 1232, flows out of the apertures of the tailpipe 1230 and fills the target location. As referenced previously, the components that form the grout 1232 react quickly. Accordingly, one advantage of the deployment system illustrated in FIG. 12 is that the components are mixed proximate to the target location and flow to the target location before the grout 1232 hardens. As non-limiting examples, it is preferred that the components of the expandable polymer grout system are mixed within the wellbore and within a distance of 50 feet from the target location, more preferably within 40 feet of the target location, and still more preferably within 30 feet of the target location. The components of FIG. 12 are not drawn to scale. Nonetheless, as one example, the height of the mixer 1220 can be between 8 and 20 inches and the height of the tailpipe 1230 can be between 5 feet and 30 feet. Taking into account these typical dimensions and the speed of the pumps 1204 and 1212, the mixture can be combined at the mixer 1220 and flow through the tailpipe 1230 to the target location within a few minutes so that the grout is in the desired position before it hardens.

As the grout 1232 flows out of the tailpipe 1230 to the target location, the support line 1218 can be used to retract the mixer 1220 and the attached tailpipe 1230 and conduits 1206, 1214 from the wellbore. The rate at which the components are pumped through the conduits can be equal to the rate at which the mixer 1220 and its attached components are retracted from the wellbore so that the mixer 1220 and tailpipe 1230 maintain a generally uniform distance from the target location as the grout accumulates in the target location. The gas zone 1240 is a porous layer below the formation 1228 from which gas or other hydrocarbons can be extracted. As illustrated in FIG. 12, the grout 1232 can be positioned so that it overlaps both the interface with the gas zone 1240 as well as the interface with the formation 1228 above the gas zone 1240. In other examples, the grout may only overlap the interface with the formation 1228 because creating a seal with the formation 1228 can be critical to sealing the well and preventing gas from escaping. Additionally, while the example of FIG. 12 shows the grout positioned at an open hole target location where no casing is present, in other embodiments, the deployment system of FIG. 12 can be used in a similar manner to position the grout at a portion of the wellbore that is lined with a casing.

Figure 13:
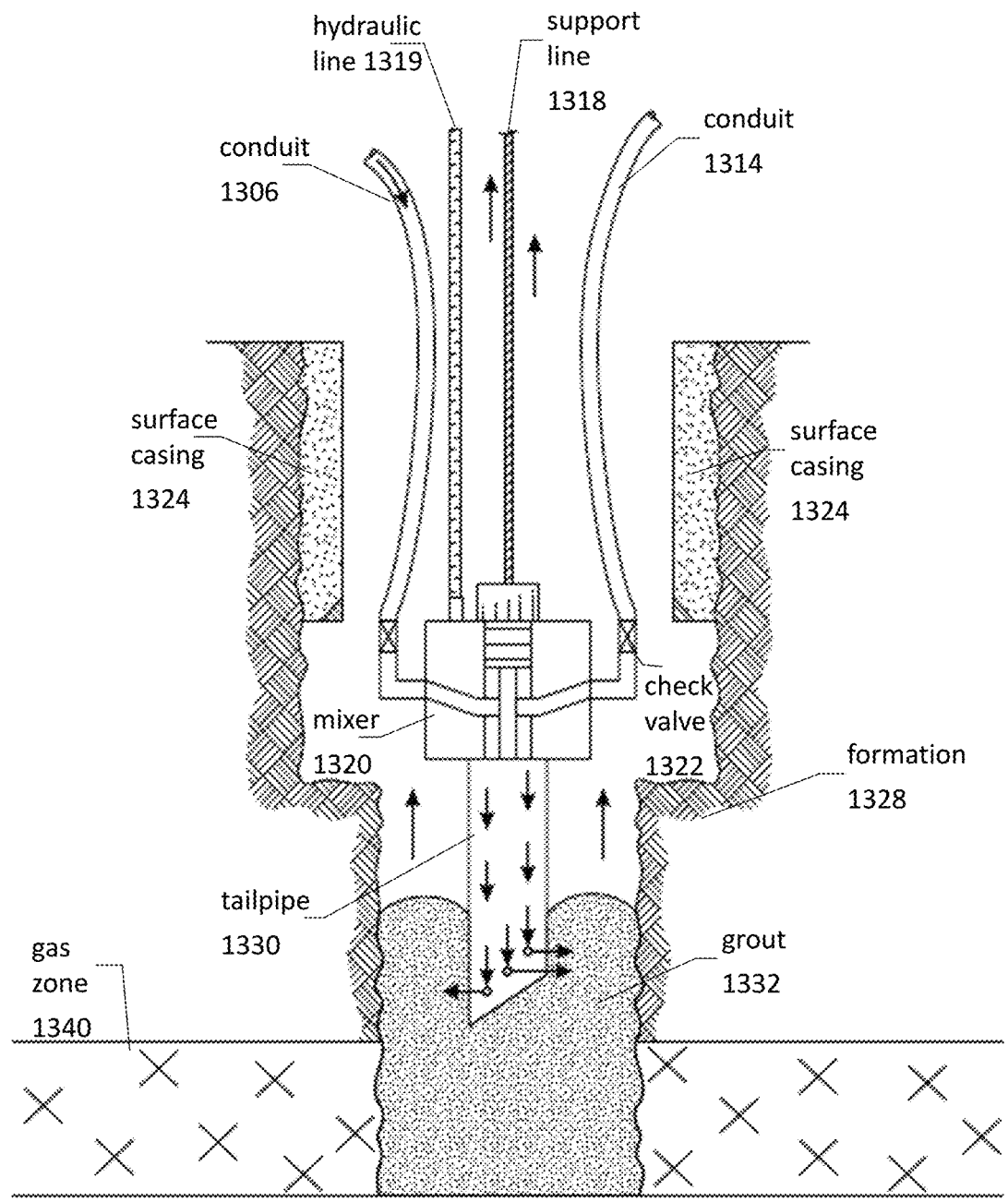
FIG. 13 is a sectional view drawing of yet another system for deploying an expandable polymer grout system in accordance with the example embodiments described herein.

Referring to FIG. 13, another example system is illustrated for deploying an expandable polymer grout system at a target location within a wellbore. Unless otherwise indicated, it can be assumed that components of the deployment system of FIG. 13 having the same last two reference digits as components of the deployment system of FIG. 12 are substantially similar to the corresponding components of FIG. 12 and a detailed description of those components will not be repeated. For simplicity, the tanks and pumps have been omitted from the illustration of the deployment system in FIG. 13.

Similar to the deployment system of FIG. 12, the deployment system of FIG. 13 includes a first conduit 1306 and a second conduit 1314 coupled to a mixer 1320. The mixer 1320 can be lowered into a wellbore via a support line 1318 until it is located at the desired position. As with the well in FIG. 12, the well of FIG. 13 includes a surface casing 1324 lining the wellbore at the top portion of the well while the bottom portion of the well is an open hole directly interfacing with the formation 1328. The first conduit 1306 can deliver an isocyanate component to the mixer 1320 and the second conduit 1314 can deliver an organic polyol component to the mixer 1320.

The primary difference in the deployment system of FIG. 13 as compared to the deployment system of FIG. 12 is that mixer 1320 is a high pressure impingement mixer with a dedicated hydraulic line 1319. The high pressure impingement mixer can be implemented if more rigorous mixing of the components is desired. It should also be understood that in other embodiments of the deployment system other types of mixers can be used. Similar to FIG. 12, the deployment system of FIG. 13 also includes a tailpipe 1330 coupled to an outlet of the mixer 1320. The tailpipe 1330 includes apertures through which grout 1332 is directed to the target location. The grout 1332 creates a seal at the interface with the gas zone 1340 and at the interface with the formation 1328. It should be understood that the alternate embodiments described in connection with FIG. 12 can also apply to the deployment system illustrated in FIG. 13.

Figure 14:
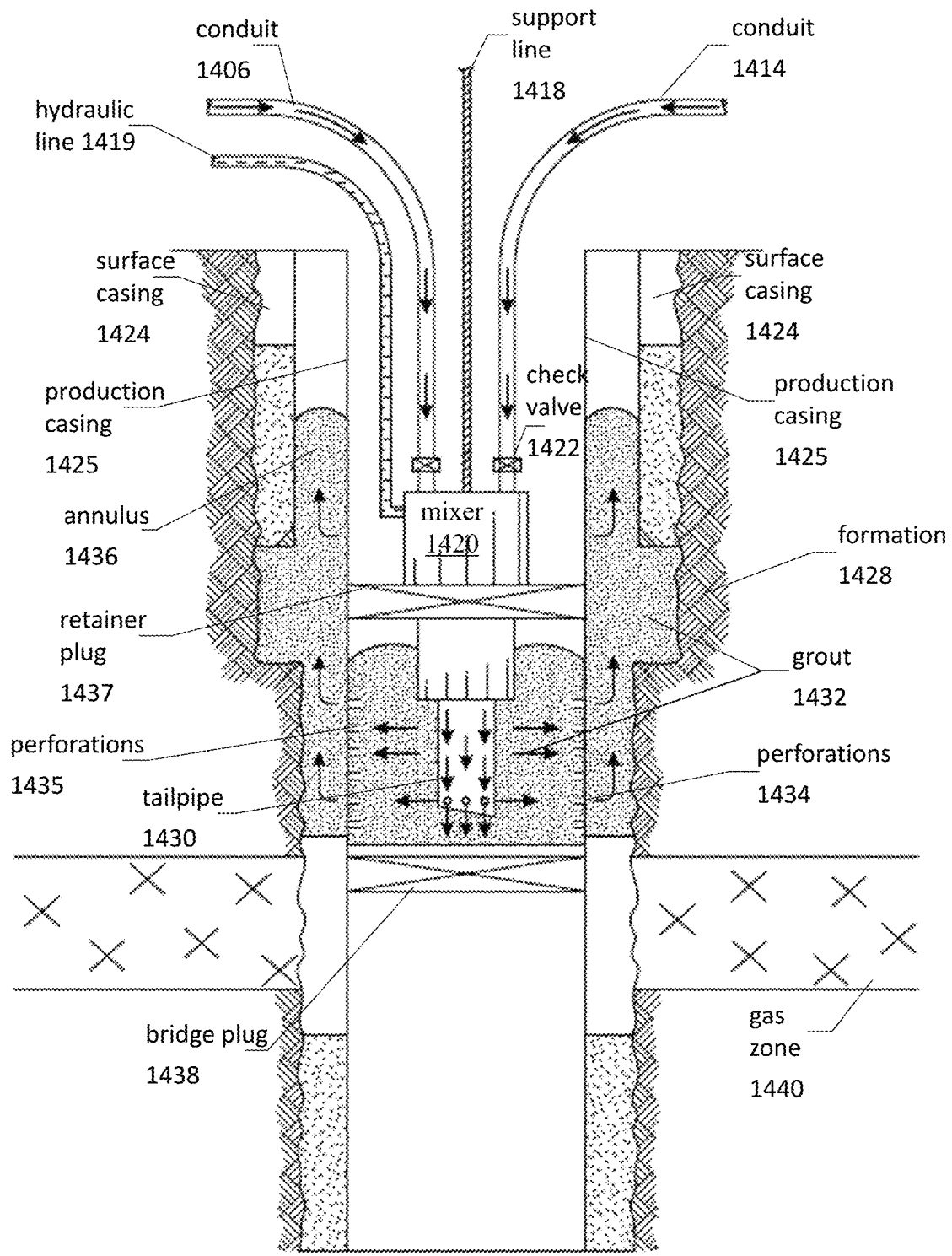
FIG. 14 is a sectional view drawing of yet another system for deploying an expandable polymer grout system in accordance with the example embodiments described herein.

Referring to FIG. 14, another example system is illustrated for deploying an expandable polymer grout system at a target location associated with a wellbore. Unless otherwise indicated, it can be assumed that components of the deployment system of FIG. 14 having the same last two reference digits as components of the deployment system of FIG. 12 are substantially similar to the corresponding components of FIG. 12 and a detailed description of those components will not be repeated. For simplicity, the tanks and pumps have been omitted from the illustration of the deployment system in FIG. 14.

Similar to the deployment system of FIG. 12, the deployment system of FIG. 14 includes a first conduit 1406 and a second conduit 1414 coupled to a mixer 1420. The mixer 1420 can be lowered into a wellbore via a support line 1418 until it is located at the desired position. Similar to the mixer 1320 of FIG. 13, mixer 1420 is a high pressure impingement mixer with a hydraulic line 1419. However, a static mixer or other type of mixer can be used with the deployment system of FIG. 14 as well. As with the well in FIG. 12, the well of FIG. 14 includes a surface casing 1424 lining the wellbore at the top portion of the well. The first conduit 1406 can deliver an isocyanate component to the mixer 1420 and the second conduit 1414 can deliver an organic polyol component to the mixer 1420.

The wellbore of FIG. 14 differs from the wellbores of FIGS. 12 and 13 in that it includes an additional casing 1425 disposed within the surface casing 1424 such that an annulus 1436 is formed between the additional casing 1425 and the surface casing 1424. The additional casing 1425 can be, for example, an intermediate casing or a production casing. The deployment system of FIG. 14 differs from the deployment systems of FIGS. 12 and 13 in that it is configured to squeeze grout 1432 through perforations 1434 and 1435 in the additional casing 1425 so that the grout 1432 can seal the annulus 1436. The deployment system of FIG. 14 includes a bridge plug 1438 located below the target location for the grout 1432 and a retainer plug 1437 located above the target location for the grout 1432. As the isocyanate and the organic polyol components are pumped into the mixer 1420 and mixed, the mixture flows from an outlet at the bottom of the mixture into tailpipe 1430. Tailpipe 1430 includes apertures that direct the grout to the target location. As the grout 1432 fills the region in the wellbore between the bridge plug 1438 and the retainer plug 1437, the pressure of the pumping squeezes the grout through the perforations 1434 and 1435 and into the annulus 1436. Thus, as the grout 1432 hardens it seals the wellbore, the perforations, and the annulus so that gas from the gas zone 1440 cannot escape the well.

Once the grout deployment is complete, the support line 1418 can be used to retract the mixer 1420 from the wellbore along with the retainer plug 1437 and the conduits 1406 and 1414. It should be understood that the alternate embodiments described in connection with FIGS. 12 and 13 can also apply to the deployment system illustrated in FIG. 14.

Figure 15:
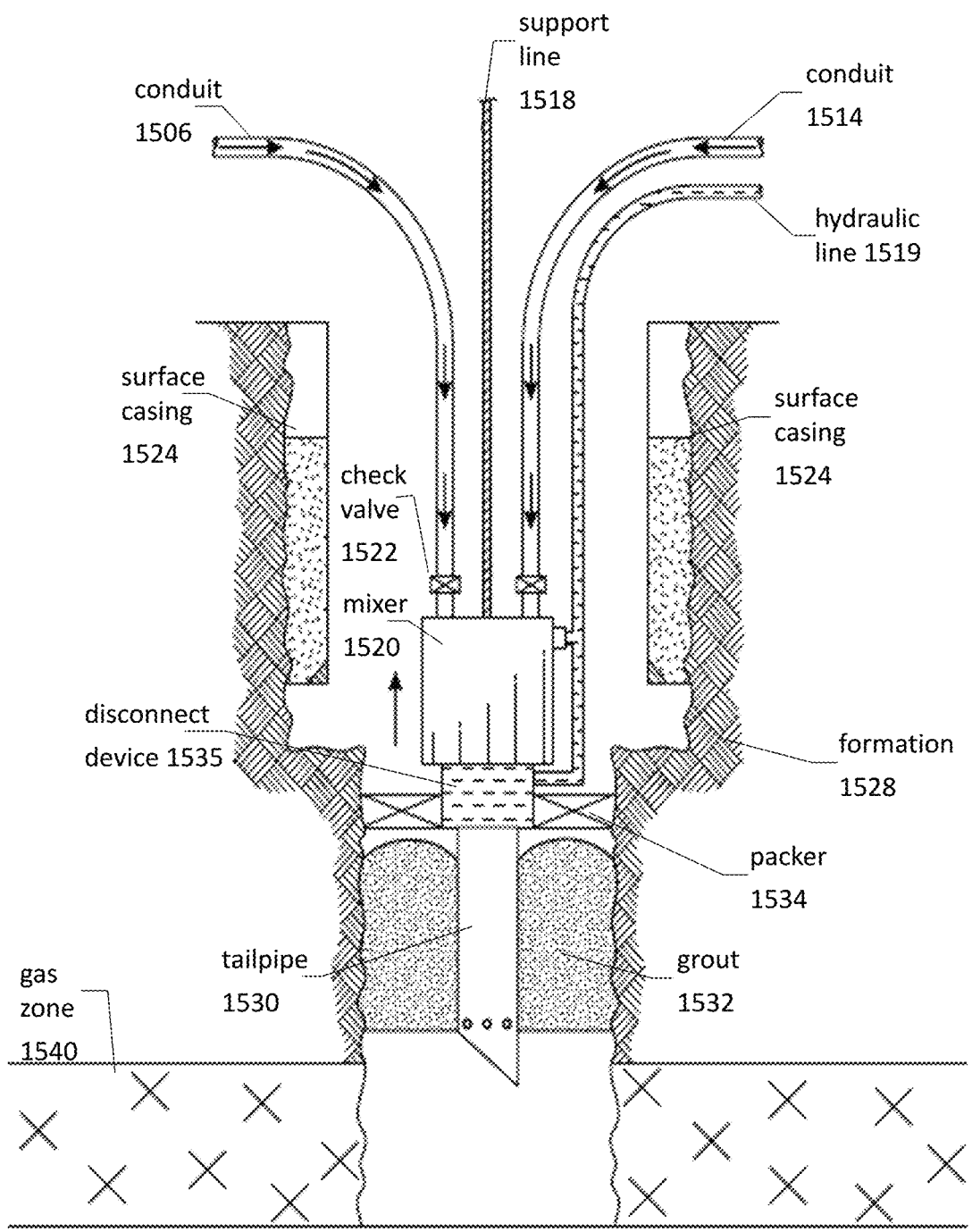
FIG. 15 is a sectional view drawing of yet another system for deploying an expandable polymer grout system in accordance with the example embodiments described herein.

Referring to FIG. 15, another example system is illustrated for deploying an expandable polymer grout system at a target location associated with a wellbore. Unless otherwise indicated, it can be assumed that components of the deployment system of FIG. 15 having the same last two reference digits as components of the deployment system of FIG. 12 are substantially similar to the corresponding components of FIG. 12 and a detailed description of those components will not be repeated. For simplicity, the tanks and pumps have been omitted from the illustration of the deployment system in FIG. 15.

Similar to the deployment system of FIG. 12, the deployment system of FIG. 15 includes a first conduit 1506 and a second conduit 1514 coupled to a mixer 1520. The mixer 1520 can be lowered into a wellbore via a support line 1518 until it is located at the desired position. Similar to the mixer 1320 of FIG. 13, mixer 1520 is a high pressure impingement mixer with a hydraulic line 1519. However, a static mixer or other type of mixer can be used with the deployment system of FIG. 15 as well. As with the well in FIG. 12, the well of FIG. 15 includes a surface casing 1524 lining the wellbore at the top portion of the well. The first conduit 1506 can deliver an isocyanate component to the mixer 1520 and the second conduit 1514 can deliver an organic polyol component to the mixer 1520.

The deployment system of FIG. 15 differs from the deployment systems of FIGS. 12, 13, and 14 in that the tailpipe 1530 is attached to the mixer 1520 with a disconnect device 1535. Furthermore, the disconnect device 1535 is secured in position by a packer 1534. After the isocyanate and organic polyol components mix in the mixer 1520, the mixture flows through the disconnect device 1535, through the tailpipe 1530, and is directed to the target location by the tailpipe's apertures. Once the grout 1532 has filled the wellbore sealing off the gas zone 1540, the disconnect device disconnects from the tailpipe 1530 and the mixer 1520, the disconnect device 1535, and the conduits 1506 and 1514 are retracted from the wellbore by the support line 1518. The tailpipe 1530 is sacrificial in that it is left behind in the grout 1532. This approach can be beneficial in that leaving the tailpipe 1530 in the grout 1532 allows the grout to harden around the tailpipe 1530 without being disturbed producing a better seal of the wellbore.

As explained with previous embodiments, although the grout plug shown in FIG. 15 creates a seal at the interface with the formation 1528, in other embodiments the grout plug could extend lower and seal the interface with the gas zone 1540. Additionally, although the grout plug of FIG. 15 is shown plugging an open hole portion of the wellbore, it can also be used to plug a cased portion of a wellbore. It should be understood that the alternate embodiments described in connection with FIG. 1214 can also apply to the deployment system illustrated in FIG. 15.

Figures 16, 17:
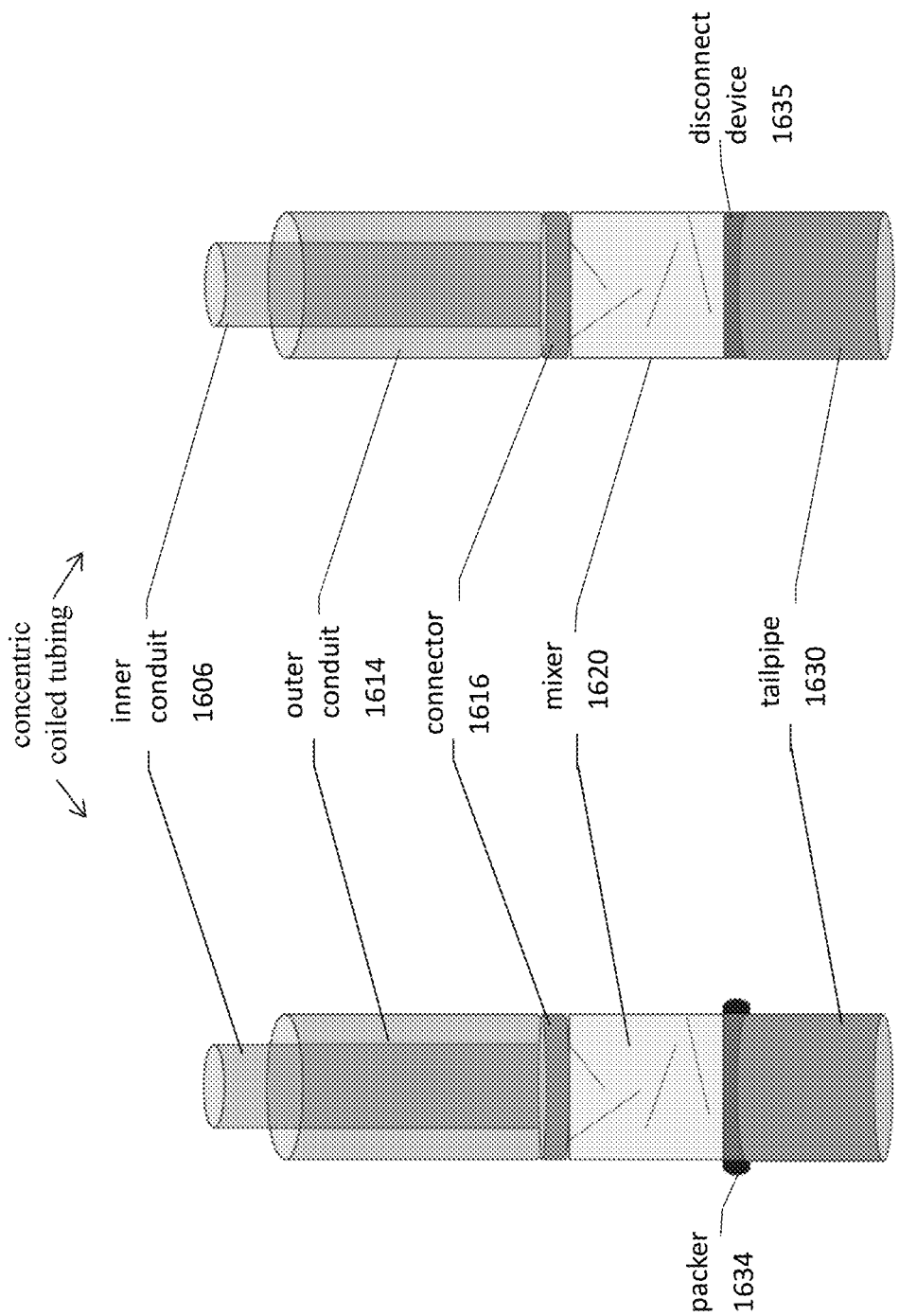
FIG. 16 is a drawing of yet another system for deploying an expandable polymer grout system in accordance with the example embodiments described herein.
FIG. 17 is a drawing of yet another system for deploying an expandable polymer grout system in accordance with the example embodiments described herein.

Referring now to FIGS. 16 and 17, additional example embodiments of a deployment system are illustrated. For simplicity, the embodiments illustrated in FIGS. 16 and 17 show only the deployment systems and not the tanks, pumps, wellbore, casing, formation, or gas zone. Unless otherwise indicated, it can be assumed that components of the deployment systems of FIGS. 16 and 17 having the same last two reference digits as components of the deployment system of FIGS. 12-15 are substantially similar to the corresponding components of FIGS. 12-15 and a detailed description of those components will not be repeated.

Similar to the deployment systems of FIGS. 12-15, the deployment system of FIGS. 16 and 17 include a first conduit 1606 and a second conduit 1614 coupled to a mixer 1620 by a connector 1616. The first conduit 1606 can deliver an isocyanate component to the mixer 1620 and the second conduit 1614 can deliver an organic polyol component to the mixer 1620. However, unlike the conduits of the previous figures, the conduits of FIGS. 16 and 17 are concentric and located within a coiled tubing so that the first conduit 1606 is an inner conduit and the second conduit 1614 is an outer conduit. The mixer 1620 illustrated in FIGS. 16 and 17 is a static mixer, but in other embodiments other types of mixers can be used. The deployment systems of FIGS. 16 and 17 can omit the support line illustrated in the previous figures because the concentric coiled tubing would typically have sufficient strength for lowering and retracting the deployment system into and from the wellbore.

The deployment system of FIG. 16 includes a packer 1634 that can be used to contain the grout as it exits the tailpipe 1630 into the wellbore. By containing the grout, the packer 1634 can be used to squeeze the grout into the perforations of a casing and/or into an annulus surrounding a casing. Although not illustrated in FIG. 16, a bridge plug can be placed below the mixer 1620 and below the tailpipe 1630 to further contain the grout for squeezing it into perforations and or an annulus. In an alternate embodiment, the tailpipe 1630 can be omitted from the deployment system and the grout can be pumped directly into the wellbore from the outlet in the bottom of the mixer 1620.

The deployment system of FIG. 17 illustrates an alternative to the deployment system of FIG. 16. The absence of a packer in FIG. 17 indicates the deployment device is for deploying grout into the wellbore below the deployment device, as opposed to squeezing the grout into casing perforations or an annulus. In FIG. 17, a disconnect device 1635 allows for attaching and detaching the tailpipe 1630 to the mixer 1620. As such, once the grout exits the mixer 1620 and the tailpipe 1630 and fills the target location in the wellbore, the tailpipe 1630 can be disconnected at the disconnect device 1635 and the tailpipe 1630 can be left behind in the hardening grout. As explained previously in connection with FIG. 15, the ability to disconnect the tailpipe can be advantageous if it is desired to avoid disturbing the grout while it hardens in the wellbore.

Although embodiments described herein are made with reference to the examples illustrated in the figures, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

We claim:

1. A deployment system comprising:
   a first conduit that conveys an isocyanate component through a wellbore;
   a second conduit that conveys an organic polyol component through the wellbore;
   a packer disposed in the wellbore;
   a mixer coupled to the first conduit, and the second conduit;
   a disconnect device coupled to an outlet of the mixer, wherein the packer creates a seal around the disconnect device when the deployment system is positioned in the wellbore; and
   a tailpipe coupled to the disconnect device, wherein the mixer is configured to:
      receive the isocyanate component via the first conduit and the organic polyol component via the second conduit,
      mix the isocyanate component and the organic polyol component into an expandable polymer grout system; and
      expel the expandable polymer grout system through the outlet of the mixer, through the disconnect device, and through the tailpipe to a target location associated with the wellbore.

2. The deployment system of claim 1, wherein the tailpipe comprises apertures in a sidewall of the tailpipe, wherein the tailpipe expels the expandable polymer grout system from the apertures in the sidewall of the tailpipe.

3. The deployment system of claim 2, wherein the disconnect device is configured to decouple the tailpipe from the outlet of the mixer leaving the tailpipe in the expandable polymer grout system after the mixer and the disconnect device are removed from the wellbore.

4. The deployment system of claim 1, wherein the mixer is either a static mixer or a pressurized impingement mixer.

5. The deployment system of claim 1, wherein the first conduit and the second conduit are components of a concentric coiled tube.

6. The deployment system of claim 1, wherein the target location is a portion of the wellbore below the mixer and proximate to a gas zone in a surrounding formation.

7. The deployment system of claim 1, further comprising a bridge plug disposed in the wellbore below the target location, wherein the target location is sealed from below by the bridge plug and sealed from above by the packer, wherein the target location comprises perforations in a casing within the wellbore, and wherein the packer and the bridge plug cause the expandable polymer grout system to be deployed in the perforations.

8. The deployment system of claim 7, wherein the target location comprises an annulus between the casing and a wall of the wellbore.

9. A deployment system comprising:
   a first conduit that conveys an isocyanate component through a wellbore;
   a second conduit that conveys an organic polyol component through the wellbore;
   a packer disposed in the wellbore;
   a mixer coupled to the first conduit, the second conduit, and a support line,
   a disconnect device coupled to an outlet of the mixer, wherein the packer creates a seal around the disconnect device when the deployment system is positioned in the wellbore; and
   a tailpipe coupled to the disconnect device, wherein the mixer configured to:
      receive the isocyanate component via the first conduit and the organic polyol component via the second conduit,
      mix the isocyanate component and the organic polyol component into an expandable polymer grout system; and
      expel the expandable polymer grout system through the outlet of the mixer, through the disconnect device, and through the tailpipe to a target location within the wellbore.

10. The deployment system of claim 9, wherein the tailpipe comprises apertures in a sidewall of the tailpipe, wherein the tailpipe expels the expandable polymer grout system from the apertures in the sidewall of the tailpipe.

11. The deployment system of claim 9, wherein the mixer is either a static mixer or a pressurized impingement mixer.

12. The deployment system of claim 9, wherein the first conduit and the second conduit are components of a concentric coiled tube.

13. The deployment system of claim 9, further comprising a bridge plug disposed in the wellbore below the target location, wherein the target location is sealed from below by the bridge plug and sealed from above by the packer wherein the target location is a portion of the wellbore below the mixer and proximate to a gas zone in a surrounding formation.

14. The deployment system of claim 9, wherein the organic polyol component comprises a blowing agent.

15. A method of deploying an expandable polymer grout system, the method comprising:
   pumping an isocyanate component via a first conduit through a wellbore;
   pumping an organic polyol component via a second conduit through the wellbore;
   mixing, in a mixer coupled to the first conduit and the second conduit, the isocyanate component and the organic polyol component to produce the expandable polymer grout system; and
   directing the expandable polymer grout system through an outlet of the mixer, through a disconnect device that is attached to the outlet and surrounded by a packer, through a tailpipe attached to the disconnect device, and to a target location associated with the wellbore.

16. The method of claim 15, wherein the expandable polymer grout system is directed out of sidewall apertures in the tailpipe to the target location.

17. The method of claim 16, further comprising:
   decoupling, by the disconnect device, the tailpipe from the outlet of the mixer and leaving the tailpipe in the expandable polymer grout system after the mixer is removed from the wellbore.

18. The method of claim 15, wherein the target location is a portion of the wellbore above a bridge plug in the wellbore, below the mixer, and proximate to a gas zone in a surrounding formation.

19. The method of claim 15, wherein the target location comprises perforations in a casing within the wellbore, and wherein the packer above the target location and a bridge plug below the target location further direct the expandable polymer grout system into the perforations.

20. The method of claim 19, wherein the target location further comprises an annulus between the casing and a formation face of the wellbore.

* * * * *